(12) United States Patent
Sone et al.

(10) Patent No.: US 12,456,441 B2
(45) Date of Patent: Oct. 28, 2025

(54) INFORMATION PROCESSING APPARATUS AND CONTROL METHOD

(71) Applicant: Lenovo (Singapore) Pte. Ltd., Singapore (SG)

(72) Inventors: Yuichi Sone, Kanagawa (JP); Yoshinori Ito, Kanagawa (JP); Kengo Sano, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/422,693

(22) Filed: Jan. 25, 2024

(65) Prior Publication Data
US 2024/0249703 A1  Jul. 25, 2024

(30) Foreign Application Priority Data

Jan. 25, 2023 (JP) .................................. 2023-009192

(51) Int. Cl.
*G09G 5/373* (2006.01)
*G06F 3/14* (2006.01)
*G09G 3/00* (2006.01)

(52) U.S. Cl.
CPC .............. *G09G 5/373* (2013.01); *G06F 3/14* (2013.01); *G09G 3/035* (2020.08); *G09G 2340/045* (2013.01); *G09G 2380/02* (2013.01)

(58) Field of Classification Search
CPC .. G09G 5/373; G09G 3/035; G09G 2340/045; G09G 2380/02; G06F 3/14
See application file for complete search history.

(56) References Cited

U.S. PATENT DOCUMENTS

| | | | | |
|---|---|---|---|---|
| 9,652,824 | B2* | 5/2017 | Masuoka | G06F 3/038 |
| 10,955,877 | B2* | 3/2021 | Ku | G06F 3/023 |
| 11,899,851 | B2* | 2/2024 | Ito | G06F 3/023 |
| 11,972,710 | B2* | 4/2024 | Ito | G09G 3/035 |
| 12,035,035 | B1* | 7/2024 | Kumar Agrawal | H04N 23/631 |
| 2002/0149685 | A1* | 10/2002 | Kobayashi | H04N 9/646 |
| | | | | 348/E5.076 |

(Continued)

FOREIGN PATENT DOCUMENTS

| | | |
|---|---|---|
| CN | 107770440 A | 3/2018 |
| JP | 2014-16519 A | 1/2014 |
| JP | 2018013850 A | 1/2018 |

*Primary Examiner* — Ariel A Balaoing
(74) *Attorney, Agent, or Firm* — Osha Bergman Watanabe & Burton LLP

(57) ABSTRACT

An information processing apparatus includes a display, a memory that temporarily stores display data to be displayed on the display, and a processor that performs control when the display data stored in the memory is displayed on the display. The processor performs a display mode switching process of switching between a first display mode in which display is controlled by using an entire screen area of the display as a display area, and a second display mode in which display is controlled by using a part of the screen area as the display area, and a display control process of, in a case in which the first display mode and the second display mode are switched by the display mode switching process, changing a display magnification to a display magnification individually set for each of the first display mode and the second display mode.

18 Claims, 10 Drawing Sheets

(56) References Cited

U.S. PATENT DOCUMENTS

| | | | |
|---|---|---|---|
| 2006/0136836 A1* | 6/2006 | Clee | G06F 3/0481 |
| | | | 715/781 |
| 2010/0122102 A1* | 5/2010 | Park | H04N 21/4424 |
| | | | 713/340 |
| 2012/0257072 A1* | 10/2012 | Jirman | G06T 3/40 |
| | | | 348/222.1 |
| 2013/0033503 A1* | 2/2013 | Besnard | G09G 5/397 |
| | | | 345/502 |
| 2015/0279328 A1* | 10/2015 | Ong | G09G 5/14 |
| | | | 345/660 |
| 2016/0260408 A1* | 9/2016 | Chen | G09G 5/005 |
| 2017/0295286 A1* | 10/2017 | Haneda | H04N 5/2628 |
| 2018/0335901 A1* | 11/2018 | Manzari | G06F 3/0484 |
| 2018/0348975 A1* | 12/2018 | Taniguchi | G06F 3/0483 |
| 2020/0333852 A1* | 10/2020 | Smith | G06F 1/1666 |
| 2021/0150953 A1* | 5/2021 | Lee | G09G 3/035 |
| 2021/0352206 A1* | 11/2021 | Chan | G06V 40/166 |
| 2022/0083148 A1* | 3/2022 | Chen | H04M 1/0268 |
| 2024/0029606 A1* | 1/2024 | Ito | G06F 3/14 |
| 2024/0249703 A1* | 7/2024 | Sone | G09G 5/373 |
| 2024/0314236 A1* | 9/2024 | Lee | G06F 1/16 |
| 2024/0319947 A1* | 9/2024 | Lee | G06F 3/14 |

* cited by examiner

INFORMATION PROCESSING APPARATUS AND CONTROL METHOD

CROSS-REFERENCE TO RELATED APPLICATIONS

This application claims priority to Japanese Patent Application No. 2023-009192 filed on Jan. 25, 2023, the contents of which are hereby incorporated herein by reference in their entirety.

BACKGROUND OF THE INVENTION

Field of the Invention

The present invention relates to an information processing apparatus and a control method.

Description of the Related Art

In recent years, an information processing apparatus in which a foldable flexible display (display unit) is provided over a first chassis and a second chassis to be bendable according to rotational movement of the first chassis and the second chassis is disclosed (see, for example, Japanese Unexamined Patent Application Publication No. 2018-13850). In a case in which one display is provided over the first chassis and the second chassis, in addition to the use of one display in a one-screen mode, one display can also be divided into a screen area on the first chassis side and a screen area on the second chassis side and used in a two-screen mode in a pseudo manner.

Since the information processing apparatus as described above is provided with one display provided over the first chassis and the second chassis, the information processing apparatus generally has a configuration in which an operation on the screen of the display is received without placing a physical keyboard. However, there is an information processing apparatus that can be used in the same use form as a laptop personal computer (PC) on which the physical keyboard is placed, by placing an external keyboard on the screen area on the second chassis side and performing display only on the screen area on the first chassis side. In this case, in the two-screen mode, a screen mode is automatically switched to a screen mode in which a screen area on a side on which the external keyboard is placed is controlled to be displayed black, and a screen area on the other side is controlled to be displayed by half the size of the screen in the one-screen mode, so that a user's convenience is improved. However, when the size of the screen area is halved, an amount of information displayed on the screen is halved. In order to increase the amount of information displayed on the screen, the user needs to manually change a display magnification (enlargement/reduction).

SUMMARY OF THE INVENTION

The present invention provides an information processing apparatus and a control method for appropriately controlling display when a size of a screen area of a display is changed.

A first aspect of the present invention relates to an information processing apparatus including: a display; a memory configured to temporarily store display data to be displayed on the display; and a processor configured to perform control when the display data stored in the memory is displayed on the display, in which the processor is configured to perform a display mode switching process of switching between a first display mode in which display is controlled by using an entire screen area of the display as a display area, and a second display mode in which display is controlled by using a part of the screen area as the display area, and a display control process of, in a case in which the first display mode and the second display mode are switched by the display mode switching process, changing a display magnification to a display magnification individually set for each of the first display mode and the second display mode.

In the information processing apparatus, the processor may be configured to: display, on the display, a setting screen on which the display magnification of each of the first display mode and the second display mode is settable by a user, and set the display magnification of each of the first display mode and the second display mode based on an operation of the user on the setting screen.

In the information processing apparatus, the processor may be configured to: perform an external connection detection process of detecting connection with an external display; and in a case in which the connection with the external display is detected, in the display control process, control display of the external display with the display magnification individually set for each of the first display mode and the second display mode according to the switching between the first display mode and the second display mode.

In the information processing apparatus, the processor may be configured to: display, on the display, a setting screen on which the display magnification of each of the first display mode and the second display mode is settable by a user for each of the display provided in the information processing apparatus and the external display, and set the display magnification of each of the first display mode and the second display mode for each of the display provided in the information processing apparatus and the external display based on an operation of the user on the setting screen.

In the information processing apparatus, on the setting screen, the display magnification of each of the first display mode and the second display mode may be further settable for each specification of the external display.

In the information processing apparatus, the processor may be configured to: display, on the display, a selection screen on which whether or not to switch between the display magnifications is selectable by a user, when the first display mode and the second display mode are switched in the display mode switching process; and determine whether or not to change the display magnification by the display control process based on an operation of the user on the selection screen.

In the information processing apparatus, the processor may be configured to: perform an external connection detection process of detecting connection with an external display; and determine whether or not to change the display magnification by the display control process when the first display mode and the second display mode are switched by the display mode switching process, based on whether or not the external display is connected.

In the information processing apparatus, the processor may be configured to: determine whether or not to change the display magnification by the display control process when the first display mode and the second display mode are switched by the display mode switching process, by using a trained model subjected to machine learning based on a setting of the display magnification after the first display mode and the second display mode are switched by the display mode switching process, and whether or not the external display is connected.

In the information processing apparatus, the processor may be configured to: determine whether or not to change the display magnification by the display control process when the first display mode and the second display mode are switched by the display mode switching process, based on a history for each user of a setting of the display magnification after the first display mode and the second display mode are switched by the display mode switching process.

In the information processing apparatus, the processor may be configured to: determine whether or not to change the display magnification by the display control process when the first display mode and the second display mode are switched by the display mode switching process, by using a trained model subjected to machine learning based on the history for each user of the setting of the display magnification after the first display mode and the second display mode are switched by the display mode switching process.

In the information processing apparatus, the processor may be configured to: determine whether or not to change the display magnification by the display control process when the first display mode and the second display mode are switched by the display mode switching process, based on a setting of the display magnification after the first display mode and the second display mode are switched by the display mode switching process, and a time zone.

In the information processing apparatus, the processor may be configured to: determine whether or not to change the display magnification by the display control process when the first display mode and the second display mode are switched by the display mode switching process, by using a trained model subjected to machine learning based on a history for each time zone of the setting of the display magnification after the first display mode and the second display mode are switched by the display mode switching process.

In the information processing apparatus, the processor may be configured to: determine whether or not to change the display magnification by the display control process when the first display mode and the second display mode are switched by the display mode switching process, based on a type of an application being used.

In the information processing apparatus, the processor may be configured to: determine whether or not to change the display magnification by the display control process when the first display mode and the second display mode are switched in the display mode switching process, by using a trained model subjected to machine learning based on a setting of the display magnification after the first display mode and the second display mode are switched by the display mode switching process, and the type of the application being used.

In the information processing apparatus, the processor may be configured to: perform a placement detection process of detecting placement of an external keyboard on a predetermined screen area of the screen area of the display; and in the display mode switching process, switch between the first display mode and the second display mode based on a detection result by the placement detection process.

In the information processing apparatus, the processor may be configured to: in the display mode switching process, perform control to the first display mode in a case in which the placement of the keyboard is not detected by the placement detection process, and perform control to the second display mode in a case in which the placement of the keyboard is detected, and in the second display mode, a partial screen area excluding the predetermined screen area is used as the display area.

In the information processing apparatus, the display may be one foldable display, and in the second display mode, one of a plurality of screen areas divided according to a crease portion when the display is folded may be used as the display area.

In addition, a second aspect of the present invention relates to a control method in an information processing apparatus including a display, a memory configured to temporarily store display data to be displayed on the display, and a processor configured to perform control when the display data stored in the memory is displayed on the display, the control method including: causing the processor to perform a display mode switching step of switching between a first display mode in which display is controlled by using an entire screen area of the display as a display area, and a second display mode in which display is controlled by using a part of the screen area as the display area, and a display control step of, in a case in which the first display mode and the second display mode are switched by the display mode switching step, changing a display magnification to a display magnification individually set for each of the first display mode and the second display mode.

The above-described aspects of the present invention can appropriately control display when the size of the screen area of the display is changed.

DETAILED DESCRIPTION OF THE INVENTION

Hereinafter, embodiments of the present invention will be described with reference to the accompanying drawings.

First Embodiment

First, a first embodiment will be described.

Figure 1:
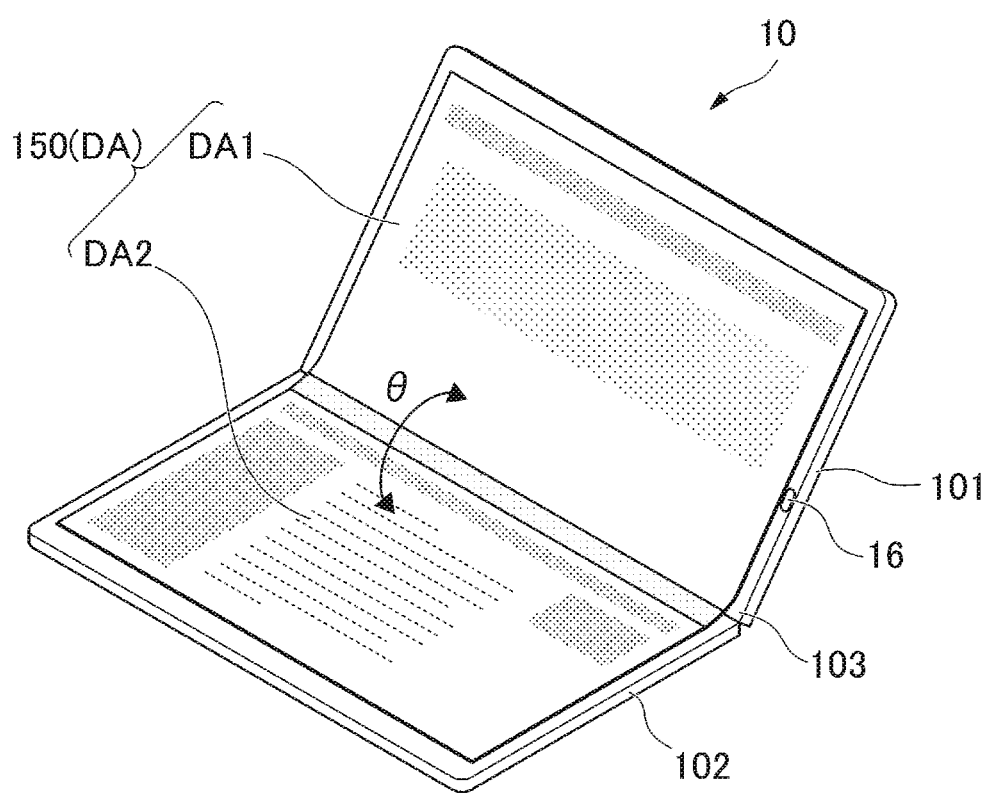
FIG. 1 is a perspective view illustrating an appearance of an information processing apparatus according to a first embodiment.

FIG. 1 is a perspective view illustrating an appearance of an information processing apparatus 10 according to the present embodiment. The information processing apparatus 10 according to the present embodiment is a clamshell (laptop) personal computer (PC). The information processing apparatus 10 is provided with a first chassis 101, a second chassis 102, and a hinge mechanism 103. The first chassis 101 and the second chassis 102 are chassis having a substantially quadrangular plate shape (for example, flat plate shape). One of side surfaces of the first chassis 101 and one of side surfaces of the second chassis 102 are coupled (connected) via the hinge mechanism 103, and the first chassis 101 and the second chassis 102 can relatively move rotationally around a rotation axis formed by the hinge mechanism 103. A state in which an opening angle θ around the rotation axis of the first chassis 101 and the second chassis 102 is about 0 degrees is a state in which the first chassis 101 and the second chassis 102 overlap each other and are closed. A state in which the first chassis 101 and the second chassis 102 are closed will be referred to as a "closed state (closed)". In the closed state, surfaces of the first chassis 101 and the second chassis 102 facing each other will be referred to as "inner surfaces", and surfaces opposite to the inner surfaces will be referred to as "outer surfaces". The opening angle θ can also be referred to as an angle formed by the inner surface of the first chassis 101 and the inner surface of the second chassis 102. A state in which the first chassis 101 and the second chassis 102 are opened with respect to the closed state will be referred to as an "open state". The open state is a state in which the first chassis 101 and the second chassis 102 are relatively moved rotationally until the opening angle θ exceeds a preset threshold value (for example, 10 degrees).

The information processing apparatus 10 is provided with a camera 16 and a display 150. The camera 16 is provided on the inner surface of the first chassis 101. The display 150 is provided over the inner surface of the first chassis 101 and the inner surface of the second chassis 102. The camera 16 is provided in, for example, an outer portion of a screen area of the display 150 on the inner surface of the first chassis 101, and can image a user or the like who exists on the side facing the display 150. The display 150 is a flexible display that can be bent according to the opening angle θ due to the relative rotational movement of the first chassis 101 and the second chassis 102 (see FIGS. 2 and 3). An organic EL display or the like is used as the flexible display. The information processing apparatus 10 can control display of an entire screen area of the display 150 as one screen area DA in a one-screen configuration, and can also control display by dividing the screen area of the display 150 into two screen areas, a first screen area DA1 and a second screen area DA2, in a two-screen configuration. Here, the first screen area DA1 and the second screen area DA2 are the screen areas that do not overlap each other. Here, among the screen areas of the display 150, a screen area corresponding to the inner surface side of the first chassis 101 is defined as the first screen area DA1, and a screen area corresponding to the inner surface side of the second chassis 102 is defined as the second screen area DA2. In the following description, a display mode in which display is controlled with the one-screen configuration will be referred to as a "one-screen mode", and a display mode in which display is controlled with the two-screen configuration will be referred to as a "two-screen mode".

It should be noted that a touch sensor is provided on the screen area of the display 150. The information processing apparatus 10 can detect a touch operation on the screen area of the display 150. By bringing the information processing apparatus 10 into an open state (in general, the opening angle θ=about 90 degrees to 180 degrees), the user can visually recognize display of the display 150 provided on the inner surface of each of the first chassis 101 and the second chassis 102, or can perform the touch operation on the display 150, and thus can use the information processing apparatus 10.

Hereinafter, a use form and the screen mode of the information processing apparatus 10 will be described in detail. First, the use forms of the information processing apparatus 10 are classified into a state (bent form) in which the first chassis 101 and the second chassis 102 are bent according to the opening angle θ between the first chassis 101 and the second chassis 102, and a flat state (flat form) in which the first chassis 101 and the second chassis 102 are not bent. In the following description, the state (bent form) in which the first chassis 101 and the second chassis 102 are bent will be simply referred to as a "bent state (bent form)", and the flat state (flat form) in which the first chassis 101 and the second chassis 102 are not bent will be simply referred to as a "flat state (flat form)". In the bent state (bent form), the display 150 provided over the first chassis 101 and the second chassis 102 is also in the bent state. In the flat state (flat form), the display 150 is also in the flat state.

Figure 2:
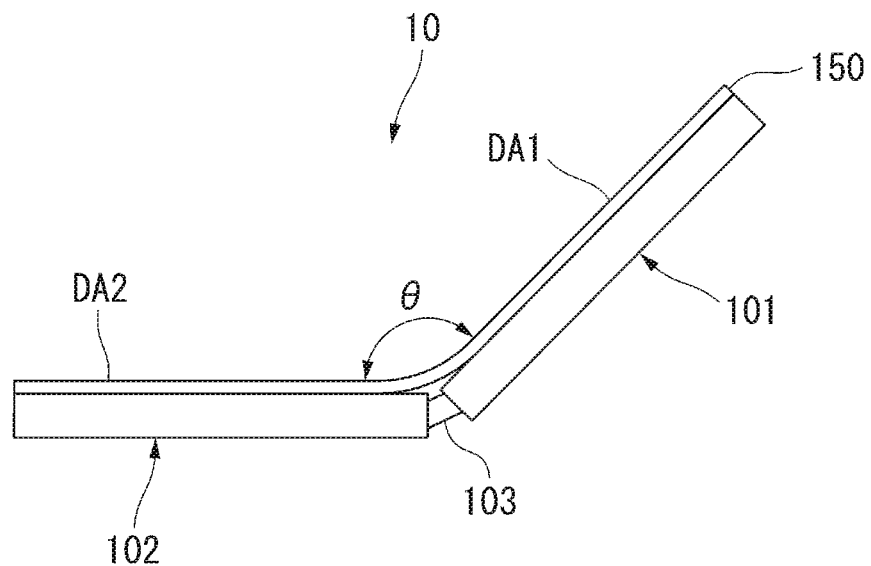
FIG. 2 is a side view illustrating an example of the information processing apparatus in a bent state according to the first embodiment.

FIG. 2 is a side view illustrating an example of the information processing apparatus 10 in the bent state (bent form). The display 150 is arranged over (across) the first chassis 101 and the second chassis 102. The screen area (screen area DA illustrated in FIG. 1) of the display 150 can be bent with a portion corresponding to the hinge mechanism 103 as a crease, and is divided into two screen areas according to the crease portion. Here, the screen area on the first chassis 101 side is illustrated as the first screen area DA1 and the screen area on the second chassis 102 side is illustrated as the second screen area DA2 with the crease portion as a boundary. The display 150 is bent according to the rotational movement (opening angle θ) of the first chassis 101 and the second chassis 102. It is determined whether or not the information processing apparatus 10 is in the bent state (bent form) according to the opening angle θ. As an example, in a case in which 10 degrees<θ<170 degrees, it is determined that the information processing apparatus 10 is in the bent state (bent form). This state corresponds to the use form such as a so-called clamshell mode or book mode.

Figure 3:
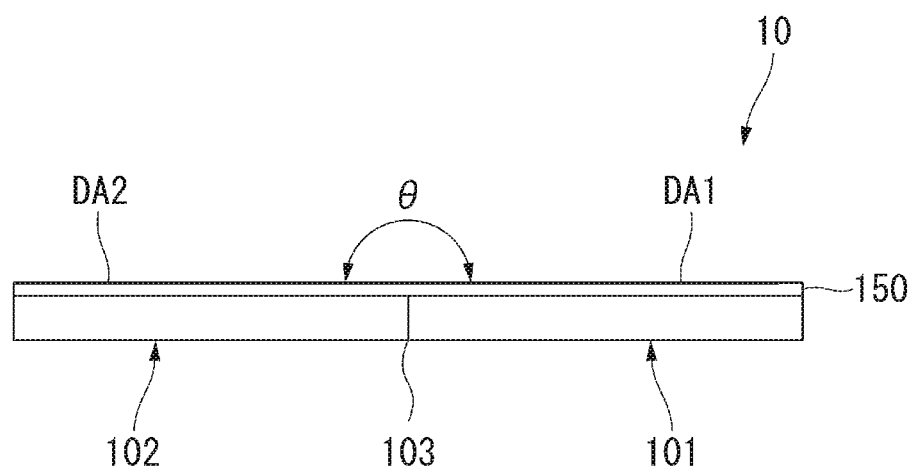
FIG. 3 is a side view illustrating an example of the information processing apparatus in a flat state according to the first embodiment.

FIG. 3 is a side view illustrating an example of the information processing apparatus 10 in the flat state (flat form). It is typically determined that the information processing apparatus 10 is in the flat state (flat form) in a case in which the opening angle θ is 180 degrees, but as an example, it may be determined that the information processing apparatus 10 is in the flat state (flat form) in a case in which 170 degrees≤θ≤180 degrees. For example, in a case in which the opening angle θ between the first chassis 101 and the second chassis 102 is 180 degrees, the display 150 is also in the flat state. This state corresponds to the use form called a so-called tablet mode.

Hereinafter, the display modes according to various use forms of the information processing apparatus 10 will be described in detail with reference to FIG. 4.

Figure 4:
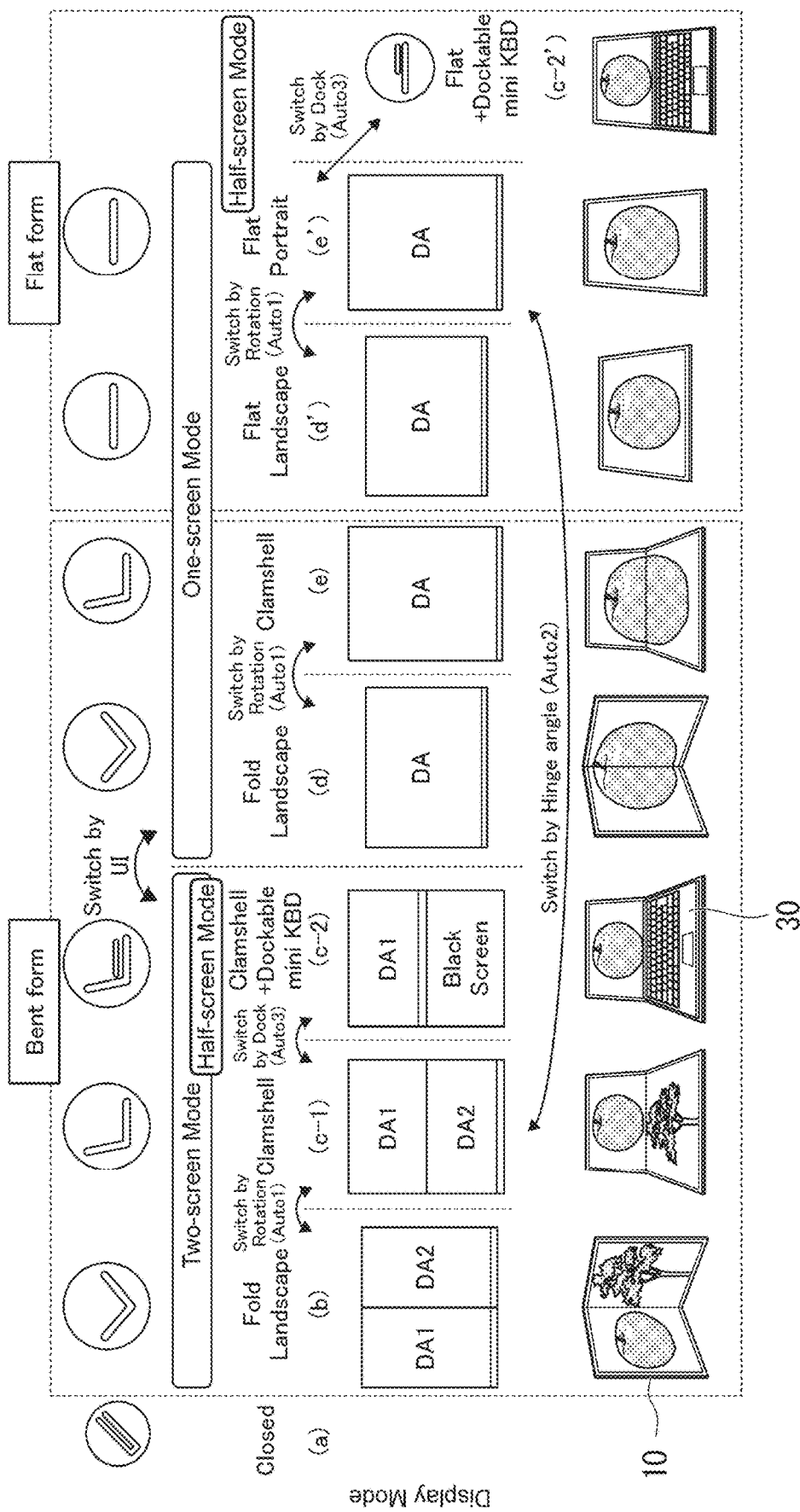
FIG. 4 is a diagram illustrating specific examples of various display modes of the information processing apparatus according to the first embodiment.

FIG. 4 is a diagram illustrating specific examples of various display modes of the information processing apparatus 10 according to the present embodiment. The information processing apparatus 10 has different display modes according to the use forms classified according to the opening angle θ between the first chassis 101 and the second chassis 102, an attitude (orientation) of the information processing apparatus 10, whether the one-screen mode is used or the two-screen mode is used, and the like. It should be noted that the one-screen will also be called a single screen, and the two-screen will also be called a split screen, a dual screen, or the like.

A display mode (a) is a display mode when the first chassis 101 and the second chassis 102 are in the closed state (Closed) as the use form. In this closed state, the information processing apparatus 10 is, for example, in a standby state such as a sleep or hibernation state (hibernation), and the display 150 is in a display-off state. The standby state such as the sleep or hibernation state (hibernation) corresponds to S3 or S4 of a power supply state of a system defined by, for example, an advanced configuration and power interface (ACPI).

A display mode (b) is a display mode when the use form is the bent state (bent form), and the two-screen mode is used in which display is controlled such that the screen area of the display 150 is divided into the two screen areas, the first screen area DA1 and the second screen area DA2. The orientation of the information processing apparatus 10 is an orientation in which the first screen area DA1 and the second screen area DA2 are in a vertical orientation and are horizontally arranged from side to side. The vertical orientation of the screen area is an orientation in which a long side of four sides of a rectangular screen area is in a vertical direction and a short side is in a horizontal direction. In a case in which the screen area is in the vertical orientation, a display orientation is also the vertical orientation, and display is performed in an orientation in which a direction along the long side corresponds to an up-down direction and a direction along the short side corresponds to a left-right direction. This use form is a use form in which left and right pages when a book is opened correspond to left and right screens, and corresponds to the so-called book mode. This use form will also be referred to as a "Fold Landscape" because the use form is the bent state (bent form), the first screen area DA1 and the second screen area DA2 are arranged side by side, and the screen area obtained by combining the first screen area DA1 and the second screen area DA2 is horizontally long.

In this display mode (b), for example, in a normal operation state, the information processing apparatus 10 is in the two-screen display mode in which the first screen area DA1 on the left side is used as a primary screen and the second screen area DA2 on the right side is used as a secondary screen. It should be noted that, in the display mode (b), a correspondence relationship between the first screen area DA1 and the second screen area DA2, and the primary screen and the secondary screen may be reversed.

As in the display mode (b), a display mode (c-1) is a display mode when the use form is the bent state (bent form), and the two-screen mode is used in which display is controlled by dividing the screen area of the display 150 into two screen areas, the first screen area DA1 and the second screen area DA2, but an orientation of the information processing apparatus 10 is different. The orientation of the information processing apparatus 10 is an orientation in which the first screen area DA1 and the second screen area DA2 are in a horizontal orientation and are vertically arranged up and down. The horizontal orientation of the screen area is an orientation in which a long side of four sides of a rectangular screen area is in a horizontal direction and a short side is in a vertical direction. In a case in which the screen area is in the horizontal orientation, a display orientation is also the horizontal orientation, and display is performed in an orientation in which a direction along the short side corresponds to an up-down direction and a direction along the long side corresponds to a left-right direction. This use form is one of general use forms of a clamshell PC.

In this display mode (c-1), for example, in a normal operation state, the information processing apparatus 10 is in the two-screen display mode in which the first screen area DA1 is used as a primary screen and the second screen area DA2 is used as a secondary screen. It should be noted that, in the display mode (c-1), a correspondence relationship between the first screen area DA1 and the second screen area DA2, and the primary screen and the secondary screen may be reversed.

For example, the information processing apparatus 10 detects a change in the attitude (orientation) of the information processing apparatus 10, and thus automatically performs switching from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when the rightward rotation from a state of the display mode (b) by a predetermined angle (for example, 45 degrees) or more is detected, the information processing apparatus 10 performs the switching to the display mode (c-1). Since the display mode (b) is a state in which the display 150 is rotated 90 degrees leftward with respect to the display mode (c-1) as illustrated, when the leftward rotation from a state of the display mode (c-1) by a predetermined angle (for example, 45 degrees) or more is detected, the information processing apparatus 10 performs the switching to the display mode (b).

As in the display mode (c-1), in a display mode (c-2), the bent state (bent form) is used and the orientation of the information processing apparatus 10 is the same, but there is a difference in that an external keyboard 30 (Dockable mini Keyboard (KBD)) that can be placed on the information processing apparatus 10 is placed at a predetermined position. This use form is a state in which the physical keyboard 30 is connected in a general use form of a clamshell PC. For example, in the present embodiment, the keyboard 30 has almost the same size as the second screen area DA2, and can be placed on the second screen area DA2. It should be noted that the keyboard 30 may be a keyboard that occupies a smaller area than the second screen area DA2. As an example, the keyboard 30 is provided with a magnet in an inner portion (end portion) of a bottom surface, and when the keyboard 30 is placed on the second screen area DA2, the keyboard 30 is attracted and fixed to a bezel portion of an end portion on the inner surface of the second chassis 102. As a result, the use form is the same as the use form of a conventional clamshell PC that is originally provided with the physical keyboard. In addition, the information processing apparatus 10 and the keyboard 30 are connected by, for example, Bluetooth (registered trademark). In this display mode (c-2), the information processing apparatus 10 controls the second screen area DA2 to be displayed black or turned off because the second screen area DA2 cannot be visually recognized due to the keyboard 30. In other words, this display mode (c-2) is a display mode (hereinafter, referred to as a "half-screen mode") in which only half screen area of the screen area DA of the display 150 is valid for display and is only the first screen area DA1 is the display area. That is, the half-screen mode is a display mode in which display is controlled by using, as the display area, a partial screen area (first screen area DA1) excluding the screen area (second screen area DA2) on the side of the screen area (screen area DA) of the display 150 on which the keyboard 30 is placed.

For example, when the information processing apparatus 10 detects the connection with the external keyboard 30 in a state of the display mode (c-1), the information processing apparatus 10 automatically performs the switching from the display mode (c-1) to the display mode (c-2) (Switch by Dock).

As in the display mode (b), in a display mode (d), the bent state (bent form) is used and the orientation of the information processing apparatus 10 is the same, but there is a difference in that the display mode (d) is the one-screen mode in which display is controlled by using the entire screen area of the display 150 is used as one screen area DA. This use form is different from the display mode (b) in that the one-screen mode is used, but will also be referred to as the "Fold Landscape" because the bent state (bent form) is used and the screen area DA is horizontally long. The screen area DA is in the horizontal orientation, and the display orientation is also the horizontal orientation.

Here, the switching between the one-screen mode and the two-screen mode in the bent state (bent form) is performed, for example, by the operation of the user. For example, the information processing apparatus 10 displays an operator as a user interface (UI) that can switch between the one-screen mode and the two-screen mode at any place on the screen, and performs the switching from the display mode (b) to the display mode (d) based on an operation on the operator (Switch by UI). Specific examples of this display mode switching operation will be described below.

As in the display mode (c-1), in a display mode (e), the bent state (bent form) is used and the orientation of the information processing apparatus 10 is the same, but there is a difference in that the display mode (d) is the one-screen mode in which display is controlled by using the entire screen area of the display 150 is used as one screen area DA. This use form is different from the display mode (c-1) in that the one-screen mode is used, but corresponds to the use form of the clamshell PC in terms of the bent state (bent form) and the orientation of the information processing apparatus 10. The screen area DA is in the vertical orientation, and the display orientation is also the vertical orientation.

For example, the information processing apparatus 10 detects a change in the attitude (orientation) of the information processing apparatus 10, and thus automatically performs switching from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when the rightward rotation from a state of the display mode (d) by a predetermined angle (for example, 45 degrees) or more is detected, the information processing apparatus 10 performs the switching to the display mode (e). Since the display mode (d) is a state in which the display 150 is rotated 90 degrees leftward with respect to the display mode (e) as illustrated, when the leftward rotation from a state of the display mode (e) by a predetermined angle (for example, 45 degrees) or more is detected, the information processing apparatus 10 performs the switching to the display mode (d).

As in the display mode (d), in a display mode (d'), the one-screen mode is used and the orientation of the information processing apparatus 10 is an orientation in which the screen area DA is horizontally long, but there is a difference in that the flat state (flat form) is used. The flat state (flat form) is a state in which the opening angle θ between the first chassis 101 and the second chassis 102 is about 180 degrees. This use form corresponds to the so-called tablet mode described with reference to FIG. 3, and will also be referred to as the "Flat Landscape" because the flat state (flat form) is used and the screen area DA is horizontally long. This display mode (d') is different from the display mode (d) only in terms of the opening angle θ between the first chassis 101 and the second chassis 102. As in the display mode (d), the screen area DA is in the horizontal orientation, and the display orientation is also the horizontal orientation.

As in the display mode (e), in a display mode (e'), the one-screen mode is used and the orientation of the information processing apparatus 10 is an orientation in which the screen area DA is vertically long, but there is a difference in that the flat state (flat form) is used. This use form will also be referred to as a "Flat Portrait" because the flat state (flat form) is used and the screen area DA is vertically long. This display mode (e') is different from the display mode (e) only in terms of the opening angle θ between the first chassis 101 and the second chassis 102. As in the display mode (e), the screen area DA is in the vertical orientation, and the display orientation is also the vertical orientation.

For example, the information processing apparatus 10 detects a change in the attitude (orientation) of the information processing apparatus 10, and thus automatically performs switching from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when the rightward rotation from a state of the display mode (d') by a predetermined angle (for example, 45 degrees) or more is detected, the information processing apparatus 10 performs the switching to the display mode (e'). Since the display mode (d') is a state in which the display 150 is rotated 90 degrees leftward with respect to the display mode (e') as illustrated, when the leftward rotation from a state of the display mode (e') by a predetermined angle (for example, 45 degrees) or more is detected, the information processing apparatus 10 performs the switching to the display mode (d').

It should be noted that, in the display mode (d') and the display mode (e'), the user can operate the above-described display mode switching icon to perform the switching to the two-screen mode while maintaining the flat state (flat form). For example, when the switching from a state of the display mode (d') to the two-screen mode is performed, the display state is the same as the display state of the display mode (b) in the flat state (flat form). When the switching from a state of the display mode (e') to the two-screen mode is performed, the display state is the same as the display state of the display mode (c-1) in the flat state (flat form).

When the information processing apparatus 10 detects the connection with the keyboard 30 in a state of the display mode (e'), the information processing apparatus 10 automatically performs the switching from the display mode (e') to the display mode (c-2') (Switch by Dock). The display mode (c-2') is the flat state (flat form), and is different from the display mode (c-2) only in terms of the opening angle θ between the first chassis 101 and the second chassis 102. In this display mode (c-2'), the information processing apparatus 10 controls the second screen area DA2 to be displayed black or turned off because the second screen area DA2 cannot be visually recognized due to the keyboard 30. In other words, as in the display mode (c-2), this display mode (c-2') is a half-screen mode in which only half screen area (first screen area DA1) of the screen area DA of the display 150 is valid for display.

The information processing apparatus 10 can be configured to perform the switching from the one-screen mode to the two-screen mode in a case in which the change from the flat state (flat form) to the bent state (bent form) is detected. For example, in a case in which the change to the bent state (bent form) in a state of the display mode (d') is detected based on the opening angle θ between the first chassis 101 and the second chassis 102, the information processing apparatus 10 automatically performs the switching from the display mode (d') to the display mode (b). In a case in which the change to the bent state (bent form) in a state of the display mode (e') is detected based on the opening angle θ between the first chassis 101 and the second chassis 102, the information processing apparatus 10 automatically performs the switching from the display mode (e') to the display mode (c-1).

Here, in a case in which the switching from the one-screen mode to the half-screen mode is performed, the size of the screen area is halved, and thus an amount of information displayed on the screen is halved when a display magnification is the same. Therefore, the information processing apparatus 10 according to the present embodiment changes the display magnification when the switching between the one-screen mode and the half-screen mode is performed. The display magnification indicates an enlargement ratio or a reduction ratio when the display data is displayed on the display 150, and is 100% when one pixel of the display data is displayed as one pixel of the display 150 (that is, displayed at the same magnification). In a case in which the display magnification exceeds 100%, the display is enlarged, and in a case in which the display magnification is less than 100%, the display is reduced.

Figure 5B:
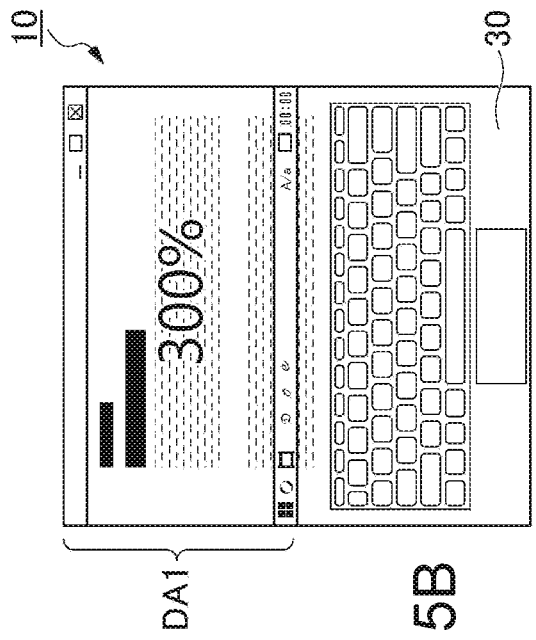
FIGS. 5A-5C are diagrams illustrating a change example of a display magnification when switching between screen modes is performed according to the first embodiment.
Figure 5C:
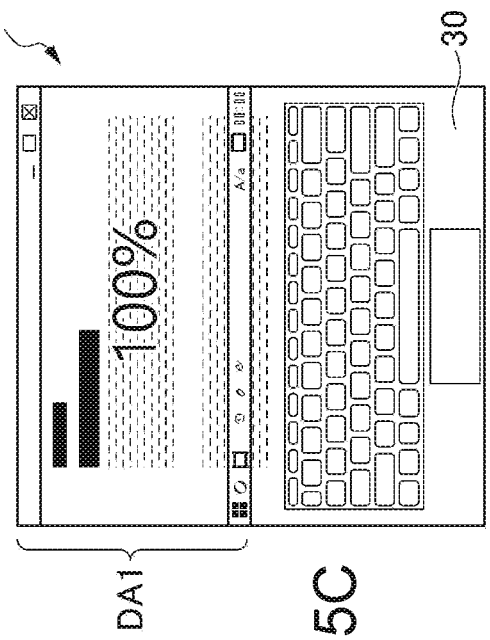
Figure 5A:
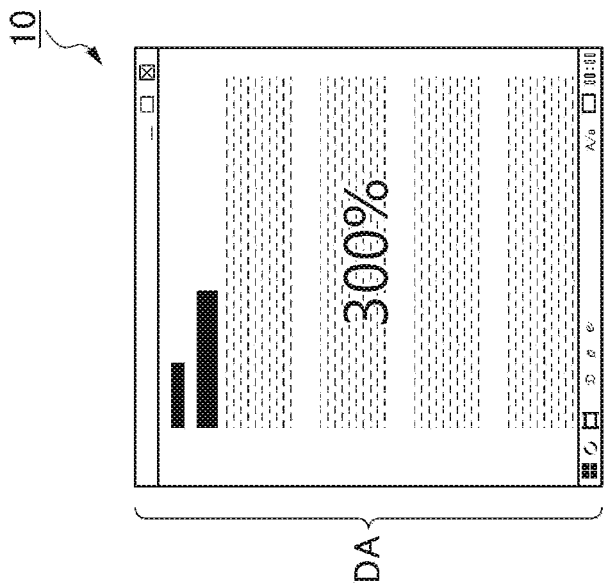

FIGS. 5A-5C are diagrams illustrating a change example of a display magnification when switching between screen modes is performed according to the present embodiment. FIG. 5A illustrates an example in which the display magnification is set to 300% in the one-screen mode. The display data of the content is displayed in the screen area DA with the display magnification of 300%. FIG. 5B illustrates a related-art example in which the display magnification is not changed when the switching from the one-screen mode to the half-screen mode is performed. In a case in which the display magnification is not changed, the display data of the content is displayed in the first screen area DA1 with the display magnification of 300%, and thus the amount of information displayed on the screen is about half the amount of information in the one-screen mode.

FIG. 5C illustrates an example in which the display magnification is changed from 300% to 100% when the switching from the one-screen mode to the half-screen mode is performed. Since the display data of the content is displayed in the first screen area DA1 with the display magnification of 100%, display is reduced as compared to display in the one-screen mode. Therefore, when the switching from the one-screen mode to the half-screen mode is performed, the amount of information displayed on the screen is increased as compared with a case in which the display magnification illustrated in FIG. 5B is not changed.

As illustrated in FIG. 5C, the information processing apparatus 10 changes the display magnification when the switching from the one-screen mode to the half-screen mode is performed. For example, the information processing apparatus 10 changes the display magnification from 300% to 100% as illustrated in FIG. 5C. As a result, the information processing apparatus 10 can suppress a decrease in the amount of information displayed on the screen when the switching from the one-screen mode to the half-screen mode is performed.

It should be noted that, here, an example is illustrated in which the display magnification of the one-screen mode is 300% and the display magnification of the half-screen mode is 100%, but this example is merely an example, and the present invention is not limited to this. By setting the display magnification of the half-screen mode to be lower than the display magnification of the one-screen mode, it is possible to suppress the decrease in the amount of information displayed on the screen when the switching from the one-screen mode to the half-screen mode is performed. In addition, the display magnification of the one-screen mode and the display magnification of the half-screen mode may be set in advance or may be settable by the user.

In addition, when the information processing apparatus 10 performs the switching from the half-screen mode to the one-screen mode, the display magnification is returned to the display magnification of the one-screen mode.

Configuration of Information Processing Apparatus 10

Hereinafter, a specific configuration of the information processing apparatus 10 will be described.

Figure 6:
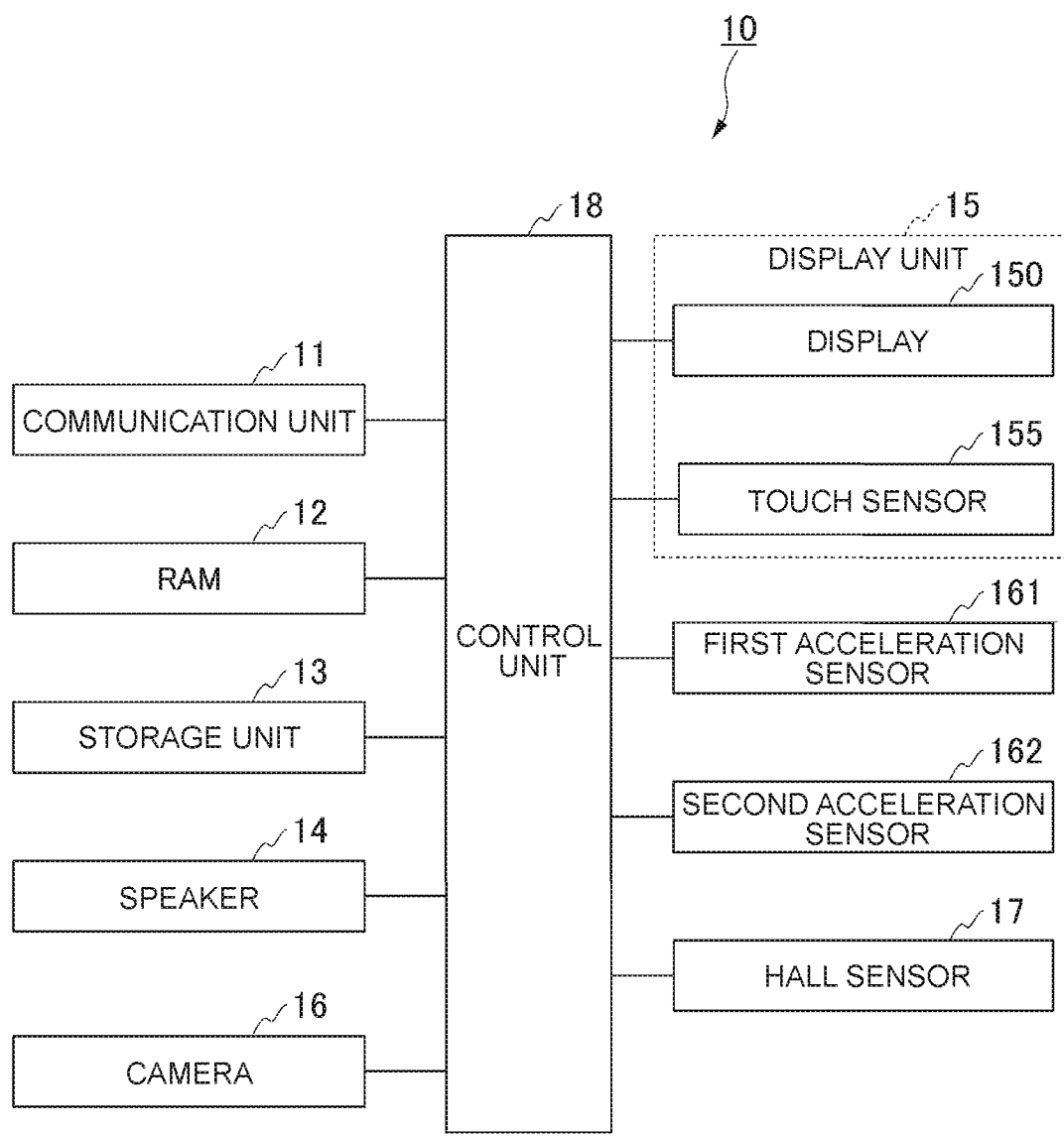
FIG. 6 is a block diagram illustrating a hardware configuration example of the information processing apparatus according to the first embodiment.

FIG. 6 is a block diagram illustrating a hardware configuration example of the information processing apparatus 10 according to the present embodiment. The information processing apparatus 10 is provided with a communication unit 11, a random access memory (RAM) 12, a storage unit 13, a speaker 14, a display unit 15, the camera 16, a first acceleration sensor 161, a second acceleration sensor 162, a hall sensor 17, and a control unit 18. These units are communicably connected to each other via a bus or the like.

The communication unit 11 includes, for example, digital input/output ports such as a plurality of Ethernet (registered trademark) ports or a plurality of universal serial buses (USB), and a communication device that performs wireless communication such as Bluetooth (registered trademark) or Wi-Fi (registered trademark). For example, the communication unit 11 can communicate with the external keyboard 30 or the like described above by using Bluetooth (registered trademark).

A program or data for the process executed by the control unit 18 is loaded in the RAM 12, and various types of data are saved or deleted as appropriate. For example, the RAM 12 also functions as a video memory (V-RAM) that temporarily stores the display data to be displayed on the display 150. As an example, the RAM 12 functions as a video memory of data displayed in the screen area DA when the display 150 is controlled in the one-screen mode. Also, the RAM 12 functions as a video memory of data displayed in the first screen area DA1 and the second screen area DA2 when the display 150 is controlled in the two-screen mode. In addition, the RAM 12 functions as a video memory of data displayed in the first screen area DA1 when the display 150 is controlled in the half-screen mode. It should be noted that, since the RAM 12 is a volatile memory, the data is not held when the supply of power to the RAM 12 is stopped. The data that needs to be held when the supply of power to the RAM 12 is stopped is transferred to the storage unit 13.

The storage unit 13 includes any one or more of a solid state drive (SSD), a hard disk drive (HDD), a read only memory (ROM), a Flash-ROM, and the like. For example, the storage unit 13 saves a program or setting data of a basic input output system (BIOS), a program of an operating system (OS) or an app operating on the OS, various types of data used in the app, and the like.

The speaker 14 outputs an electronic sound, a voice, or the like.

The display unit 15 is provided with the display 150 and a touch sensor 155. As described above, the display 150 is a flexible display that can be bent according to the opening angle θ due to the relative rotational movement of the first chassis 101 and the second chassis 102. The display 150 performs display corresponding to each display mode described with reference to FIG. 4 according to the control of the control unit 18. The touch sensor 155 is provided on the screen of the display 150, and detects the touch operation on the screen. For example, the touch sensor 155 detects the touch operation on the screen area DA in the one-screen mode. In addition, the touch sensor 155 detects the touch operation on one or both of the first screen area DA1 and the second screen area DA2 in the two-screen mode. In addition, the touch sensor 155 detects the touch operation on the first screen area DA1 in the half-screen mode. A tap operation, a slide operation, a flick operation, a swipe operation, a pinch operation, and the like are included in the touch operation. The touch sensor 155 detects the touch operation to output operation information based on the detected operation to the control unit 18.

The camera 16 includes a lens, an imaging element, and the like. The camera 16 captures an image (a still image or a moving image) according to the control of the control unit 18 to output data of the captured image.

The first acceleration sensor 161 is provided inside the first chassis 101, and detects the orientation of the first chassis 101 and the change in the orientation. For example, assuming that a direction parallel to a longitudinal direction of the first screen area DA1 is an X1 direction, a direction parallel to a lateral direction is a Y1 direction, and a direction perpendicular to the X1 direction and the Y1 direction is a Z1 direction, the first acceleration sensor 161 detects acceleration in each of the X1 direction, the Y1 direction, and the Z1 direction to output the detection result to the control unit 18.

The second acceleration sensor 162 is provided inside the second chassis 102, and detects the orientation of the second chassis 102 and the change in the orientation. For example, assuming that a direction parallel to a longitudinal direction of the second screen area DA2 is an X2 direction, a direction parallel to a lateral direction is a Y2 direction, and a direction perpendicular to the X2 direction and the Y2 direction is a Z2 direction, the second acceleration sensor 162 detects acceleration in each of the X2 direction, the Y2 direction, and the Z2 direction to output the detection result to the control unit 18.

The hall sensor 17 is provided to detect whether or not the keyboard 30 is placed. For example, when the keyboard 30 is placed on the second screen area DA2 of the second chassis 102, a magnetic field is changed due to approaching of the magnet provided in the inner portion of the bottom surface of the keyboard 30, and the detection value (output value) of the hall sensor 17 is changed. In other words, the hall sensor 17 outputs different detection results according to whether or not the keyboard 30 is placed.

The control unit 18 includes a processor such as a central processing unit (CPU), a graphic processing unit (GPU), or a microcomputer, and realizes various functions by the processor executing the programs (various programs such as the BIOS, the OS, and the app operating on the OS) stored in the storage unit 13 or the like. For example, the control unit 18 detects the attitude (orientation) of the information processing apparatus 10 based on the detection results of the first acceleration sensor 161 and the second acceleration sensor 162. In addition, the control unit 18 detects, based on the detection results of the first acceleration sensor 161 and the second acceleration sensor 162, whether the information processing apparatus 10 is in the open state or the closed state, and whether the information processing apparatus 10 is in the bent state (bent form) or the flat state (flat form) in a case of the open state, or the like. The control unit 18 detects whether or not the keyboard 30 is placed on the second screen area DA2. Then, the control unit 18 controls the display mode switching illustrated in FIG. 4, based on the attitude (orientation) and the state of the information processing apparatus 10, the presence or absence of the connection with the keyboard 30, and the like, which are detected. In addition, as described with reference to FIGS. 5A-5C, the control unit 18 changes the display magnification when the switching between the one-screen mode and the half-screen mode is performed.

Here, the one-screen mode is a display mode in which the entire screen area DA of the display 150 is used as the display area. Therefore, in the following description, the one-screen mode will be referred to as a "full-screen mode" with respect to the half-screen mode.

(Functional Configuration)

Hereinafter, a functional configuration of the information processing apparatus 10 for a display magnification control process in which the control unit 18 changes the display magnification when the switching between the full-screen mode and the half-screen mode is performed will be described in detail.

Figure 7:
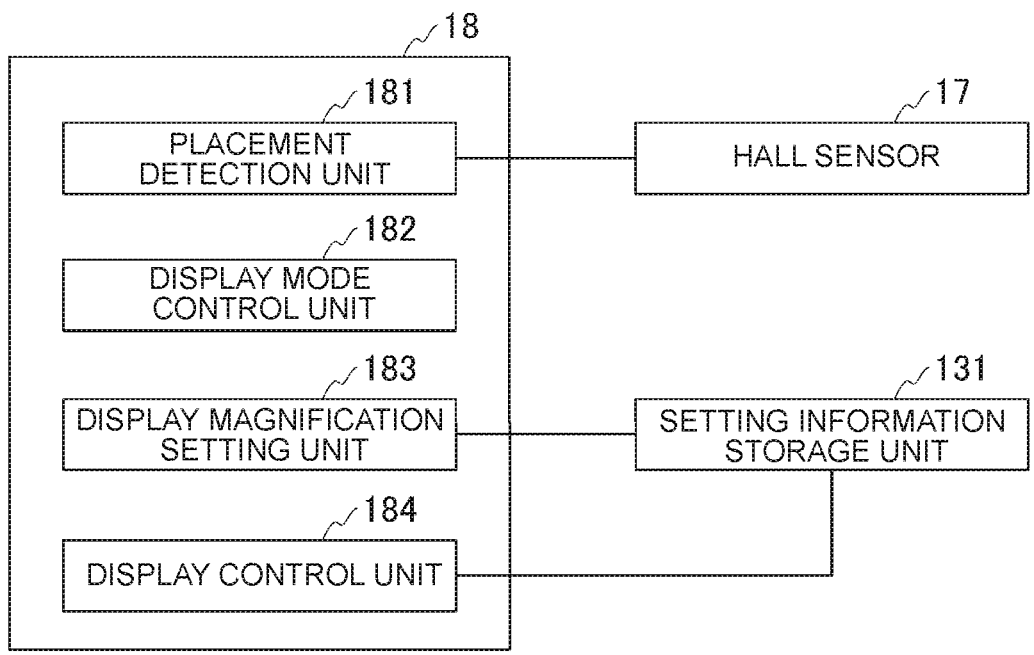
FIG. 7 is a block diagram illustrating a functional configuration example of the information processing apparatus according to the first embodiment.

FIG. 7 is a schematic block diagram illustrating an example of the functional configuration of the information processing apparatus 10 according to the present embodiment. The control unit 18 is provided with a placement detection unit 181, a display mode control unit 182, a display magnification setting unit 183, and a display control unit 184.

The placement detection unit 181 detects the placement of the keyboard 30 on the second screen area DA2 of the screen area DA of the display 150 based on the detection result by the hall sensor 17. For example, the placement detection unit 181 detects whether or not the keyboard 30 is placed on the second screen area DA2 based on the detection value (output value) of the hall sensor 17.

The display mode control unit 182 performs a display mode switching process of controlling the switching between the display modes illustrated in FIG. 4. For example, the display mode control unit 182 performs the switching between the full-screen mode and the half-screen mode based on the detection result by the placement detection unit 181. For example, the display mode control unit 182 controls whether to perform the switching from the full-screen mode to the half-screen mode or to perform the switching from the half-screen mode to the full-screen mode, based on the detection result by the placement detection unit 181. Specifically, the display mode control unit 182 performs control to the full-screen mode in a case in which the placement of the keyboard 30 is detected by the placement detection unit 181, and performs control to the half-screen mode in a case in which the placement of the keyboard 30 is not detected.

It should be noted that, even in a case in which the placement of the keyboard 30 on the second screen area DA2 is detected, when the communication connection with the keyboard 30 is not made, the display mode control unit 182 may maintain the full-screen mode without performing the switching to the half-screen mode.

The display magnification setting unit 183 sets the display magnification of the full-screen mode and the display magnification of the half-screen mode. For example, the display magnification of the full-screen mode and the display magnification of the half-screen mode are individually set, and may be set in advance in a program for performing the display mode switching.

The display magnification of the full-screen mode and the display magnification of the half-screen mode may be individually settable by the user. For example, the display magnification setting unit 183 displays, on the display 150, a setting screen in which the display magnification of each of the full-screen mode and the half-screen mode is settable by the user.

Figure 8:
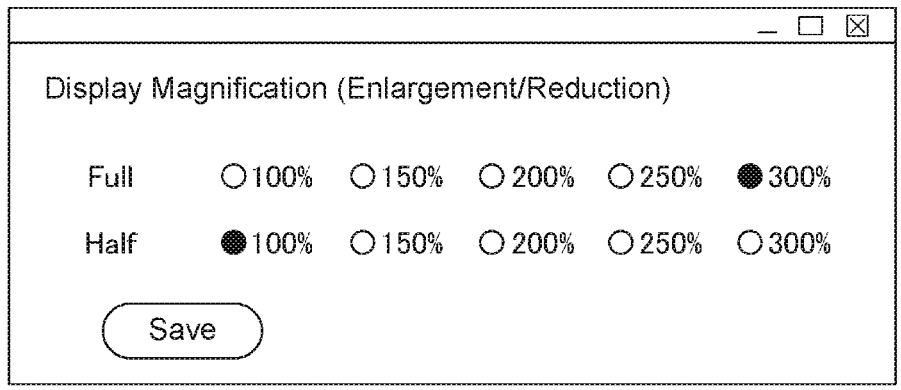
FIG. 8 is a diagram illustrating an example of a display magnification setting screen according to the first embodiment.

FIG. 8 is a diagram illustrating an example of a display magnification setting screen according to the present embodiment. In the illustrated example of the display magnification setting screen, five options of 100%, 150%, 200%, 250%, and 300% are displayed for each of the display magnification of the full-screen mode (Full) and the display magnification of the half-screen mode (Half), together with radio buttons. The user can select the display magnification of the full-screen mode (Full) by performing an operation of selecting the radio button of any one option of the display magnification of the full-screen mode (Full). In addition, the user can select the display magnification of the half-screen mode (Half) by performing an operation of selecting the radio button of any one option of the display magnification of the half-screen mode (Half). When the user performs an operation on "save" after selecting the display magnification with the radio button, the display magnification setting unit 183 sets the selected display magnification of each of the full-screen mode and half-screen mode.

Figure 9:
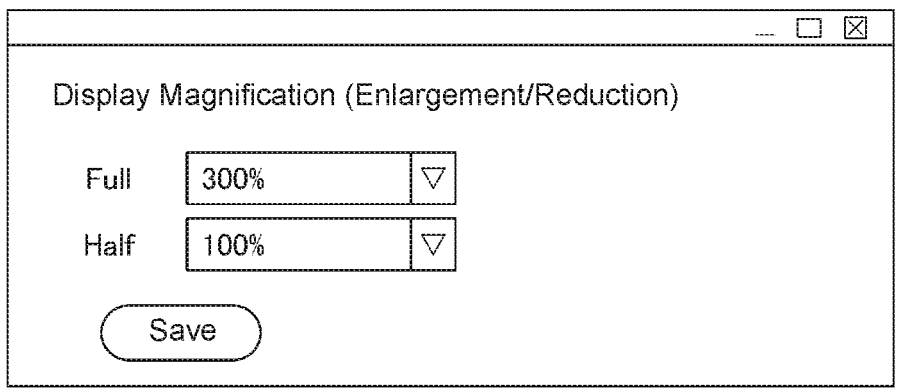
FIG. 9 is a diagram illustrating another example of the display magnification setting screen according to the first embodiment.

FIG. 9 is a diagram illustrating another example of the display magnification setting screen according to the present embodiment. The illustrated example of the display magnification setting screen is an example in which the display magnification is selected in a pull-down (drop-down) manner instead of the example of selecting the display magnification with the radio button as illustrated in FIG. 8. The user can select the display magnification of the full-screen mode (Full) by performing an operation of selecting any one option of the display magnification of the full-screen mode (Full) in the pull-down manner. In addition, the user can select the display magnification of the half-screen mode (Half) by performing an operation of selecting any one option of the display magnification of the half-screen mode (Half) in the pull-down manner. When the user performs an operation on "save" after selecting the display magnification in the pull-down manner, the display magnification setting unit 183 sets the selected display magnification of each of the full-screen mode and half-screen mode.

It should be noted that, in the display magnification setting screens illustrated in FIGS. 8 and 9, the restriction may be performed such that the display magnification of the half-screen mode cannot be set to be larger than the display magnification of the full-screen mode. For example, in a case in which the display magnification of the full-screen mode is set to 300%, any of the five options of 100%, 150%, 200%, 250%, and 300% is selectable as the display magnification of the half-screen mode, but in a case in which the display magnification of the full-screen mode is set to 200%, only three options of 100%, 150%, and 200% may be selectable as the display magnification of the half-screen mode.

Returning to FIG. 7, when the display magnification of each of the full-screen mode and the half-screen mode is set based on the operation of the user on the display magnification setting screen (for example, see FIGS. 8 and 9), the display magnification setting unit 183 stores each display magnification in a setting information storage unit 131. The setting information storage unit 131 is, for example, included in the storage unit 13.

The display control unit 184 performs a display control process of controlling display of the display 150 according to the switching of the display mode by the display mode control unit 182. For example, in a case in which the switching between the full-screen mode and the half-screen mode is performed by the display mode control unit 182, the display control unit 184 changes the display magnification to the display magnification individually set for each of the full-screen mode and the half-screen mode. As an example, in a case in which the switching from the full-screen mode to the half-screen mode is performed by the display mode control unit 182, the display control unit 184 changes the display magnification from 300% to 100%. In addition, in a case in which the switching from the half-screen mode to the full-screen mode is performed by the display mode control unit 182, the display control unit 184 changes the display magnification from 100% to 300%.

The display mode control unit 182 may display, on the display 150, the selection screen on which whether or not to perform the switching the display magnification is selectable by the user when switching between the full-screen mode and the half-screen mode. The display control unit 184 may determine whether or not to change the display magnification when the switching between the full-screen mode and the half-screen mode is performed, based on the operation of the user on the selection screen.

(Operation of Display Magnification Control Process)

Hereinafter, an operation of the display magnification control process of changing the display magnification when the control unit 18 performs the switching between the full-screen mode and the half-screen mode will be described.

Figure 10:
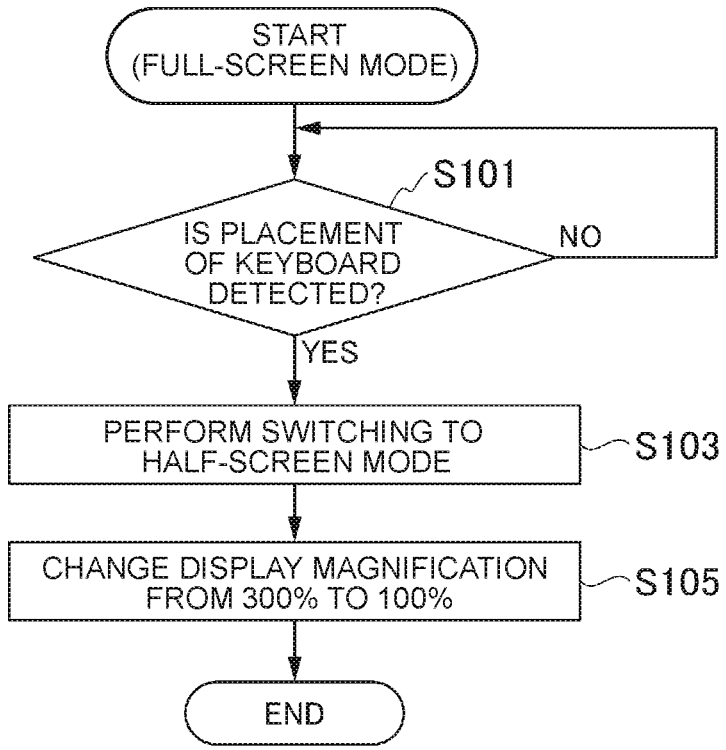
FIG. 10 is a flowchart illustrating a first example of a display magnification control process according to the first embodiment.

FIG. 10 is a flowchart illustrating a first example of the display magnification control process according to the present embodiment. Here, an operation of the display magnification control process of changing the display magnification when the switching from the full-screen mode to the half-screen mode is performed will be described.

(Step S101) The control unit 18 detects the placement of the keyboard 30 on the second screen area DA2 of the screen area DA of the display 150 based on the detection result of the hall sensor 17, and determines whether or not the keyboard 30 is placed. In a case in which the control unit 18 determines that the keyboard 30 is placed (YES), the control unit 18 proceeds to the process of step S103. On the other hand, in a case in which the control unit 18 determines that the keyboard 30 is not placed (NO), the control unit 18 performs the process of step S101 again.

(Step S103) The control unit 18 performs the switching from the full-screen mode to the half-screen mode, and proceeds to the process of step S105.

(Step S105) The control unit 18 changes the display magnification from 300% to 100%. It should be noted that, in a case in which the display magnification is set by the user, the control unit 18 refers to the setting information storage unit 131 to change the display magnification to the display magnification of the half-screen mode set by the user.

Figure 11:
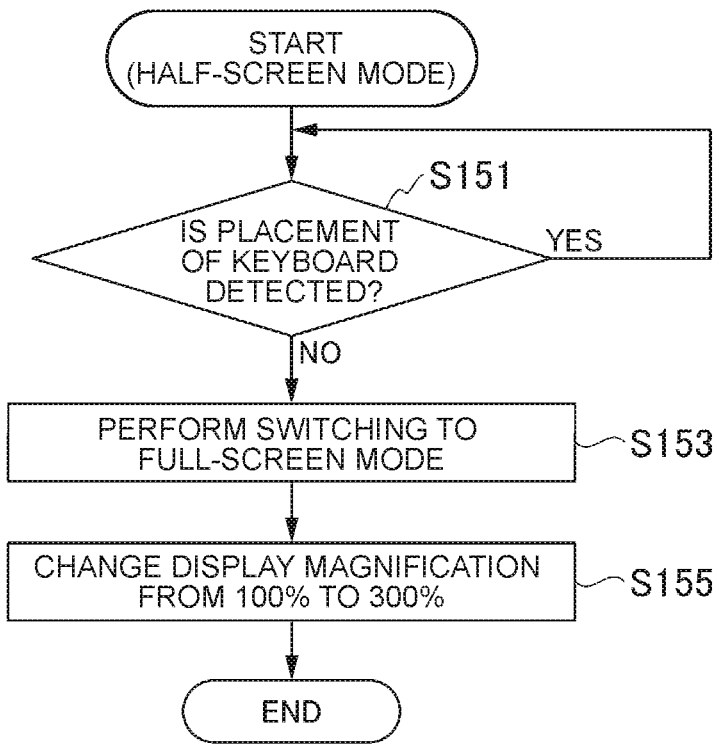
FIG. 11 is a flowchart illustrating a second example of the display magnification control process according to the first embodiment.

FIG. 11 is a flowchart illustrating a second example of the display magnification control process according to the present embodiment. Here, an operation of the display magnification control process of changing the display magnification when the switching from the half-screen mode to the full-screen mode is performed will be described.

(Step S151) The control unit 18 detects the placement of the keyboard 30 on the second screen area DA2 of the screen area DA of the display 150 based on the detection result of the hall sensor 17, and determines whether or not the keyboard 30 is placed. In a case in which the control unit 18 determines that the keyboard 30 is placed (YES), the control unit 18 proceeds to the process of step S151 again. On the other hand, in a case in which the control unit 18 determines that the keyboard 30 is not placed (NO), the control unit 18 proceeds to the process of step S153.

(Step S153) The control unit 18 performs the switching from the half-screen mode to the full-screen mode, and proceeds to the process of step S155.

(Step S155) The control unit 18 changes the display magnification from 100% to 300%. It should be noted that, in a case in which the display magnification is set by the user, the control unit 18 refers to the setting information storage unit 131 to change the display magnification to the display magnification of the full-screen mode set by the user.

Summary of First Embodiment

As described above, the information processing apparatus 10 according to the present embodiment includes the display 150, the RAM 12 (an example of a memory) that temporarily stores the display data to be displayed on the display 150, and the control unit 18 (for example, an example of a configuration including any processor such as a CPU, a GPU, or a microcomputer) that performs control when the display data stored in the RAM 12 is displayed on the display 150. The control unit 18 performs the display mode switching process of switching between the full-screen mode (an example of a first display mode) in which display is controlled by using the entire screen area DA of the display 150 as the display area, and the half-screen mode (an example of a second display mode) in which display is controlled by using a part (for example, the first screen area DA1) of the screen area DA as the display area. The control unit 18 performs the display control process of, in a case in which the full-screen mode and the half-screen mode are switched by the display mode switching process, changing the display magnification to the display magnification individually set for each of the full-screen mode and the half-screen mode.

As a result, when the switching between the full-screen mode and the half-screen mode is performed, the information processing apparatus 10 can perform display at an appropriate display magnification according to each screen mode. For example, the information processing apparatus 10 can appropriately control the amount of information displayed in a case of the switching between the full-screen mode and the half-screen mode is performed. Therefore, the information processing apparatus 10 can appropriately control display when the size of the screen area of the display 150 is changed.

In addition, the control unit 18 may display, on the display 150, the display magnification setting screen (an example of a setting screen, see FIGS. 8 and 9) on which the display magnification of each of the full-screen mode and the half-screen mode is settable by the user, and may set the display magnification of each of the full-screen mode and the half-screen mode based on the operation of the user on the display magnification setting screen.

As a result, the information processing apparatus 10 can control the display magnification of each of the full-screen mode and the half-screen mode to match the display magnification according to the user's request.

In addition, the control unit 18 may display, on the display 150, the selection screen on which whether or not to switch between the display magnifications is selectable by the user when the full-screen mode and the half-screen mode are switched in the display mode switching process. In this case, the control unit 18 determines whether or not to change the display magnification by the display control process based on the operation of the user on the selection screen.

As a result, the information processing apparatus 10 can control whether or not to change the display magnification when the switching between the full-screen mode and the half-screen mode is performed, according to the user's request.

In addition, the control unit 18 performs a placement detection process of detecting the placement of the external keyboard 30 on a predetermined screen area (for example, the second screen area DA2) of the screen area DA of the display 150. In the display mode switching process, the control unit 18 performs the switching between the full-screen mode and the half-screen mode based on the detection result by the placement detection process.

As a result, the information processing apparatus 10 can appropriately perform the switching between the full-screen mode and the half-screen mode automatically according to whether or not the keyboard 30 is placed.

For example, in the display mode switching process, the control unit 18 performs control to the full-screen mode in a case in which the placement of the keyboard 30 is not detected in the placement detection process, and performs control to the half-screen mode in a case in which the placement of the keyboard 30 is detected. Here, in the half-screen mode, a partial screen area (for example, the first screen area DA1) excluding the predetermined screen area (for example, the second screen area DA2) is used as the display area.

As a result, the information processing apparatus 10 can appropriately perform the switching between the full-screen mode and the half-screen mode automatically according to whether or not the keyboard 30 is placed.

In addition, the display 150 is one foldable display. In the half-screen mode, one (for example, the first screen area DA1) of a plurality of screen areas divided according to the crease portion when the display 150 is folded is used as the display area.

As a result, in the half-screen mode, the information processing apparatus 10 can use an appropriate screen area as the display area according to the crease portion of one foldable display 150.

In addition, there is a control method in the information processing apparatus 10 according to the present embodiment including causing the control unit 18 to perform a display mode switching step of switching between the full-screen mode (an example of a first display mode) in which display is controlled by using the entire screen area DA of the display 150 as the display area, and the half-screen mode (an example of a second display mode) in which display is controlled by using a part (for example, the first screen area DA1) of the screen area DA as the display area, and a display control step of, in a case in which the full-screen mode and the half-screen mode are switched by the display mode switching step, changing the display magnification to the display magnification individually set for each of the full-screen mode and the half-screen mode.

As a result, when the switching between the full-screen mode and the half-screen mode is performed, the information processing apparatus 10 can perform display at an appropriate display magnification according to each screen mode. For example, the information processing apparatus 10 can appropriately control the amount of information displayed in a case of the switching between the full-screen mode and the half-screen mode is performed. Therefore, the information processing apparatus 10 can appropriately control display when the size of the screen area of the display 150 is changed.

Second Embodiment

Hereinafter, a second embodiment will be described.

A basic configuration of the information processing apparatus 10 according to the present embodiment is the same as the configuration described with reference to FIGS. 1 to 6 in the first embodiment, and thus the description thereof will be omitted. In the present embodiment, a control example in a case in which an external display is connected and used will be described. For example, the information processing apparatus 10 is connected to the external display via a connection terminal (not illustrated) such as a display port or an HDMI (registered trademark). It should be noted that the information processing apparatus 10 may be connected to the external display via the communication unit 11 via wireless communication such as a wireless LAN.

For example, in a case in which the external display is connected, the information processing apparatus 10 may interlock the display magnification of the external display with the display magnification to be changed according to the switching between the full-screen mode and the half-screen mode.

Figure 12:
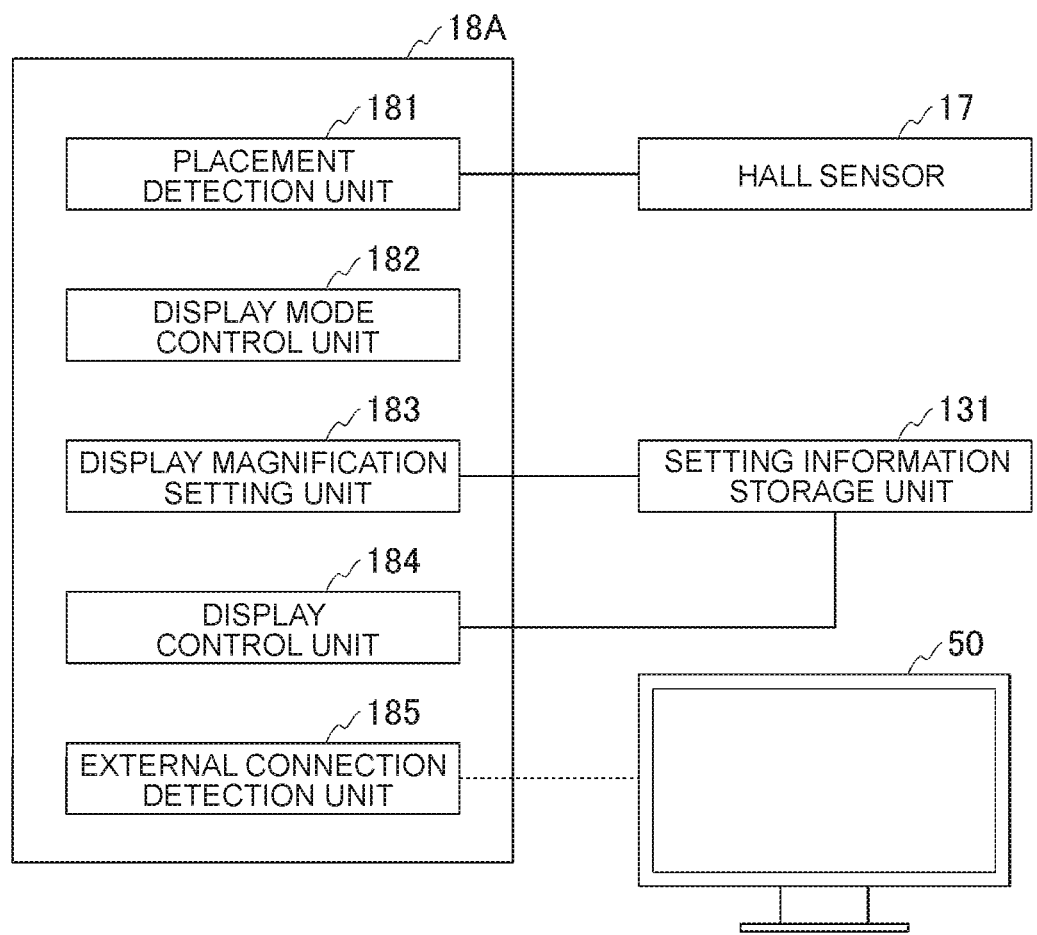
FIG. 12 is a block diagram illustrating a functional configuration example of an information processing apparatus according to a second embodiment.

FIG. 12 is a schematic block diagram illustrating an example of the functional configuration of the information processing apparatus 10 according to the present embodiment. In FIG. 12, the configuration corresponding to each unit of FIG. 7 is denoted by the same reference numeral. A control unit 18A is provided with the placement detection unit 181, the display mode control unit 182, the display magnification setting unit 183, the display control unit 184, and an external connection detection unit 185, and is different from the control unit 18 in FIG. 7 in terms of the configuration in which the external connection detection unit 185 that detects the connection with the external display 50 is provided.

The external connection detection unit 185 performs an external connection detection process of detecting the connection with the external display 50. For example, in a case in which the external connection detection unit 185 detects the connection with the external display 50, information such as a specification (screen size, resolution, or the like) of the external display 50 is acquired from the external display 50.

In a case in which the external connection detection unit 185 detects that the external display 50 is connected, the display control unit 184 controls display of the external display 50 with the display magnification individually set for each of the full-screen mode and the half-screen mode according to the switching between the full-screen mode and the half-screen mode. That is, the display control unit 184 also controls display of the external display 50 at the same display magnification as the display 150 according to the switching between the full-screen mode and the half-screen mode.

Figure 13:
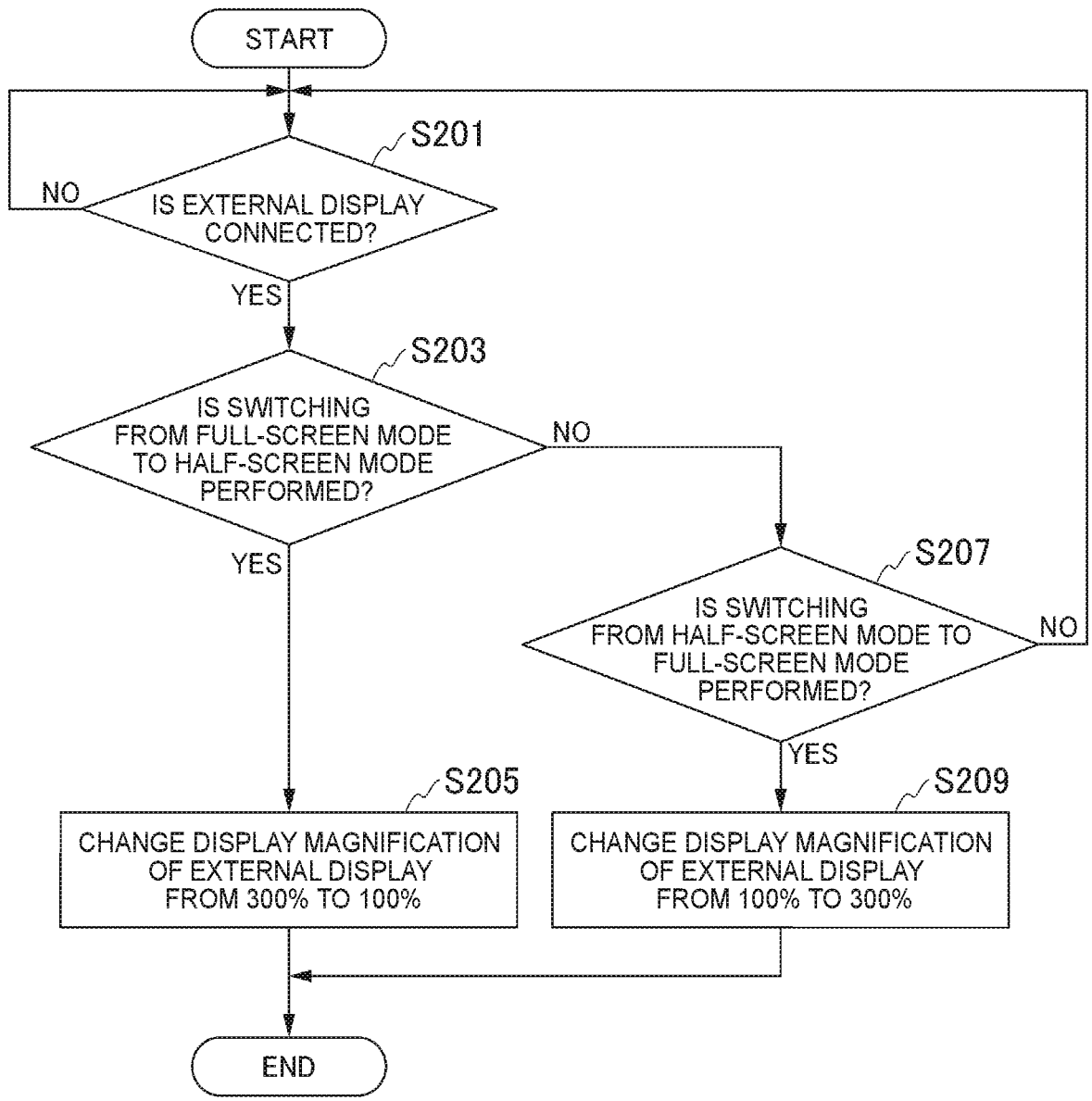
FIG. 13 is a flowchart illustrating an example of a display magnification control process of an external display according to the second embodiment.

Here, an operation of the display magnification control process of changing the display magnification of the external display 50 when the control unit 18A performs the switching between the full-screen mode and the half-screen mode will be described. FIG. 13 is a flowchart illustrating an example of the display magnification control process of the external display 50 according to the present embodiment.

(Step S201) The control unit 18A determines whether or not the external display 50 is connected, by detecting the connection with the external display 50. In a case in which the control unit 18A determines that the external display 50 is not connected (NO), the control unit 18A performs the process of step S201 again. On the other hand, in a case in which the control unit 18A determines that the external display 50 is connected (YES), the control unit 18A proceeds to the process of step S203.

(Step S203) The control unit 18A determines whether or not to perform the switching from the full-screen mode to the half-screen mode. In a case in which the control unit 18A determines to perform the switching from the full-screen mode to the half-screen mode (YES), the control unit 18A proceeds to the process of step S205. On the other hand, in a case in which the control unit 18A determines not to perform the switching from the full-screen mode to the half-screen mode (NO), the control unit 18A proceeds to the process of step S207.

(Step S205) When the switching from the full-screen mode to the half-screen mode is performed, the control unit 18A changes the display magnification of the external display 50 from 300% to 100%. It should be noted that, in a case in which the display magnification is set by the user, the control unit 18A refers to the setting information storage unit 131 to change the display magnification to the display magnification of the half-screen mode set by the user.

(Step S207) The control unit 18A determines whether or not to perform the switching from the half-screen mode to the full-screen mode. In a case in which the control unit 18A determines to perform the switching from the half-screen mode to the full-screen mode (YES), the control unit 18A proceeds to the process of step S209. On the other hand, in a case in which the control unit 18A determines not to perform the switching from the half-screen mode to the full-screen mode (NO), the control unit 18A returns to the process of step S201.

(Step S209) When the switching from the half-screen mode to the full-screen mode is performed, the control unit 18A changes the display magnification of the external display 50 from 100% to 300%. It should be noted that, in a case in which the display magnification is set by the user, the control unit 18A refers to the setting information storage unit 131 to change the display magnification to the display magnification of the full-screen mode set by the user.

As described above, in the information processing apparatus 10 according to the present embodiment, the control unit 18A performs the external connection detection process of detecting connection with the external display 50, and in a case in which the connection with the external display 50 is detected, in the display control process, the control unit 18A controls display of the external display 50 with the display magnification individually set for each of the full-screen mode and the half-screen mode in response to the switching between the full-screen mode and the half-screen mode.

As a result, the information processing apparatus 10 can interlock the display magnification of the external display 50 with the display magnification of the display 150 on the main body side.

Third Embodiment

Hereinafter, a third embodiment will be described.

A basic configuration of the information processing apparatus 10 according to the present embodiment is the same as the configuration described with reference to FIGS. 1 to 6 in the first embodiment, and thus the description thereof will be omitted. In addition, a functional configuration of the information processing apparatus 10 according to the present embodiment is the same as the configuration illustrated in FIG. 12. In the present embodiment, a control example in a case in which the external display 50 is connected and used as in the second embodiment will be described, but the control example has a configuration in which the display magnification for the external display 50 can be set separately from the display magnification of the display 150.

Figure 14:
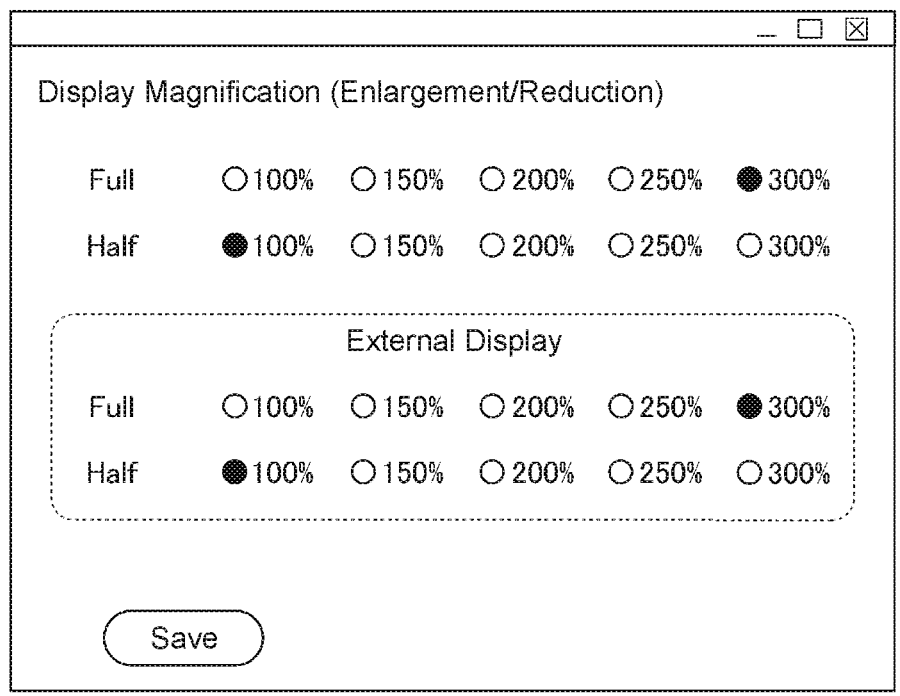
FIG. 14 is a diagram illustrating an example of a display magnification setting screen according to a third embodiment.

FIG. 14 is a diagram illustrating an example of a display magnification setting screen according to the present embodiment. The illustrated example of the display magnification setting screen is different from the example illustrated in FIG. 8 in that options of the display magnification for the external display 50 are included in addition to the options of the display magnification for the display 150. The user can select the display magnification for the external display 50 separately from the display magnification for the display 150 in each of the full-screen mode (Full) and the half-screen mode (Half). It should be noted that, although the example illustrated in FIG. 14 is an example of selecting the display magnification with the radio button, a screen for selecting the display magnification in a pull-down (drop-down) manner may be used.

As described above, in the information processing apparatus 10 according to the present embodiment, the control unit 18A displays, on the display 150, the display magnification setting screen on which the display magnification of each of the full-screen mode and the half-screen mode is settable by the user for each of the display 150 provided in the information processing apparatus 10 and the external display. Then, the control unit 18A sets the display magnification of each of the full-screen mode and the half-screen mode for each of the display 150 provided in the information processing apparatus 10 and the external display 50 based on the operation of the user on the display magnification setting screen.

As a result, the information processing apparatus 10 can individually control each of the display magnification of the display 150 and the display magnification of the external display 50 according to the user's request when the full-screen mode and the half-screen mode are switched.

It should be noted that, on the display magnification setting screen, the display magnification of each of the full-screen mode and the half-screen mode may be further settable for each specification (screen size or resolution) of the external display 50. For example, the options of the display magnification of each of the full-screen mode and the half-screen mode of the external display 50 may be displayed to be selectable for each resolution (for example, "HD" or "4K").

As a result, the information processing apparatus 10 can more appropriately control the display magnification of the external display 50 when the full-screen mode and the half-screen mode are switched.

Fourth Embodiment

Hereinafter, a fourth embodiment will be described. A basic configuration of the information processing apparatus 10 according to the present embodiment is the same as the configuration described with reference to FIGS. 1 to 6 in the first embodiment, and thus the description thereof will be omitted. In the present embodiment, a configuration will be described in which whether or not to execute the display magnification control process of changing the display magnification when the full-screen mode and the half-screen mode are switched as described in the first to third embodiments is determined based on a predetermined condition. The predetermined condition will be described below.

(1) Example in Which Presence or Absence of Connection with External Display 50 is Used as Condition For example, in the functional configuration of the information processing apparatus 10 illustrated in FIG. 12, the external connection detection unit 185 provided in the control unit 18A performs the external connection detection process of detecting the connection with the external display 50. Then, the display control unit 184 may determine whether or not to execute the display magnification control process of changing the display magnification when the full-screen mode and the half-screen mode are switched by the display mode control unit 182, based on whether or not the external display 50 is connected.

For example, the display control unit 184 executes the display magnification control process in a case in which the external display 50 is not connected. On the other hand, the display control unit 184 does not execute the display magnification control process in a case in which the external display 50 is connected. In other words, in a case in which the external display 50 is connected, it is possible to estimate that the external display 50 is mainly viewed by the user, and thus the display control unit 184 does not change the display magnification of the external display 50 having the screen area that is relatively larger than the screen area of the display 150.

As described above, the control unit 18A performs the external connection detection process of detecting the connection with the external display 50, and determines whether or not to change the display magnification, when the full-screen mode and the half-screen mode are switched, based on whether or not the external display 50 is connected.

As a result, the information processing apparatus 10 can appropriately control whether or not to change the display magnification when the full-screen mode and the half-screen mode are switched, according to the presence or absence of the connection with the external display 50.

It should be noted that the information processing apparatus 10 may determine whether or not to execute the display magnification control process in each of a case in which the external display 50 is connected and a case in which the external display 50 is not connected, by performing machine learning of the display magnification actually set by the user in each of a case in which the external display 50 is connected and a case in which the external display 50 is not connected.

Figure 15:
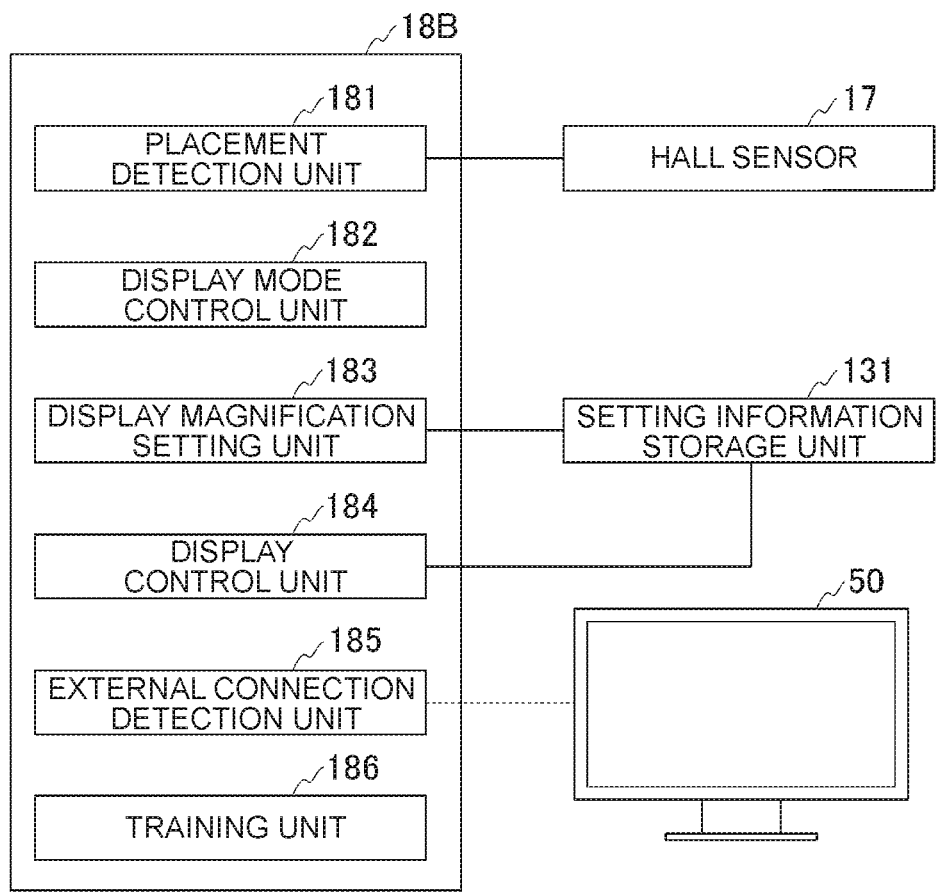
FIG. 15 is a block diagram illustrating a functional configuration example of an information processing apparatus according to a fourth embodiment.

FIG. 15 is a schematic block diagram illustrating an example of a functional configuration of the information processing apparatus 10 according to the present embodiment in which the machine learning is performed. In FIG. 15, the configuration corresponding to each unit of FIGS. 7 and 12 is denoted by the same reference numeral. A control unit 18B is provided with the placement detection unit 181, the display mode control unit 182, the display magnification setting unit 183, the display control unit 184, the external connection detection unit 185, and a training unit 186, and is different from the control unit 18A in FIG. 12 in that the training unit 186 is provided.

The training unit 186 performs the machine learning based on the input data to generate a trained model. For example, the training unit 186 performs the machine learning using, as an input data set, the setting of the display magnification after the full-screen mode and the half-screen mode are switched and whether or not the external display 50 is connected, to generate the trained model.

The control unit 18B determines whether or not to change the display magnification when the full-screen mode and the half-screen mode are switched, by using the trained model subjected to the machine learning based on the setting of the display magnification after the full-screen mode and the half-screen mode are switched, and whether or not the external display 50 is connected.

As a result, the information processing apparatus 10 can appropriately control whether or not to change the display magnification when the full-screen mode and the half-screen mode are switched, according to the presence or absence of the connection with the external display 50.

(2) Example in Which Setting Profile of Display Magnification for Each User is Used as Condition For example, in the functional configuration of the information processing apparatus 10 illustrated in FIG. 7 or 12, a setting profile (history) of the display magnification set by the user after the full-screen mode and the half-screen mode are switched in the past may be saved in association with each user (each identification information of the user), and whether or not to change the display magnification when the full-screen mode and the half-screen mode are switched may be determined based on the setting profile. It should be noted that the setting profile includes a setting value of the display magnification set by the user, information on whether or not the user changes the display magnification, and the like.

For example, the control unit 18 (or the control unit 18A) determines whether or not to change the display magnification when the full-screen mode and the half-screen mode are switched, based on the setting profile (history) of the setting of the display magnification after the full-screen mode and the half-screen mode are switched, for each user.

As a result, the information processing apparatus 10 can appropriately control whether or not to change the display magnification when the switching between the full-screen mode and the half-screen mode is performed, for each user.

It should be noted that the information processing apparatus 10 may determine whether or not to execute the display magnification control process for each user by performing the machine learning of the setting profile (history) of the display magnification for each user (for each identification information of the user).

For example, in the functional configuration of the information processing apparatus 10 illustrated in FIG. 15, the training unit 186 provided in the control unit 18B performs the machine learning using, as the input data set, the setting profile for each user including the setting of the display magnification after the full-screen mode and the half-screen mode are switched and the identification information of the user, to generate the trained model.

The control unit 18B determines whether or not to change the display magnification when the full-screen mode and the half-screen mode are switched, by using the trained model subjected to the machine learning based on the setting profile (history) for each user of the setting of the display magnification after the full-screen mode and the half-screen mode are switched.

As a result, the information processing apparatus 10 can appropriately control whether or not to change the display magnification when the switching between the full-screen mode and the half-screen mode is performed, for each user.

(3) Example in Which Time Zone is Used as Condition

For example, in the functional configuration of the information processing apparatus 10 illustrated in FIG. 7 or 12, a setting value of the display magnification set by the user after the full-screen mode and the half-screen mode are switched in the past or information on whether or not the user changes the display magnification may be saved in association with a time zone, and whether or not to change the display magnification when the full-screen mode and the half-screen mode may be determined according to the time zone.

For example, the control unit 18 (or the control unit 18A) determines whether or not to change the display magnification when the full-screen mode and the half-screen mode are switched, based on the setting of the display magnification after the full-screen mode and the half-screen mode are switched, and the time zone.

As a result, the information processing apparatus 10 can appropriately control whether or not to change the display magnification when the switching between the full-screen mode and the half-screen mode is performed, according to the time zone.

It should be noted that the information processing apparatus 10 may determine whether or not to execute the display magnification control process for each user by performing the machine learning of the setting of the display magnification for each time zone.

For example, in the functional configuration of the information processing apparatus 10 illustrated in FIG. 15, the training unit 186 provided in the control unit 18B performs the machine learning using, as the input data set, the setting profile (history) for each time zone including the setting of the display magnification after the full-screen mode and the half-screen mode are switched and the time zone, to generate the trained model.

The control unit 18B determines whether or not to change the display magnification when the full-screen mode and the half-screen mode are switched, by using the trained model subjected to the machine learning based on the setting profile (history) for each time zone of the setting of the display magnification after the full-screen mode and the half-screen mode are switched.

As a result, the information processing apparatus 10 can appropriately control whether or not to change the display magnification when the switching between the full-screen mode and the half-screen mode is performed, according to the time zone.

(4) Example in Which Application Being Used is Used as Condition

For example, in the functional configuration of the information processing apparatus 10 illustrated in FIG. 7 or 12, a setting value of the display magnification set by the user after the full-screen mode and the half-screen mode are switched in the past or information on whether or not the user changes the display magnification may be saved in association with the type of the application being used, and whether or not to change the display magnification when the full-screen mode and the half-screen mode may be determined according to a type of the application being used.

Here, the type of application being used may be any of a title, a version, a genre, and the like of the application.

For example, when the control unit 18 (or the control unit 18A) determines whether or not to change the display magnification when the switching between the full-screen mode and the half-screen mode is performed, based on the type of the application being used.

As a result, the information processing apparatus 10 can appropriately control whether or not to change the display magnification when the switching between the full-screen mode and the half-screen mode is performed, according to the type of the application being used.

It should be noted that the information processing apparatus 10 may determine whether or not to execute the display magnification control process for each type of the application being used, by performing the machine learning of the setting of the display magnification for each type of the application being used.

For example, in the functional configuration of the information processing apparatus 10 illustrated in FIG. 15, the training unit 186 provided in the control unit 18B performs the machine learning using, as the input data set, the setting profile (history) for each user including the setting of the display magnification after the full-screen mode and the half-screen mode are switched and the type of the application being used, to generate the trained model.

The control unit 18B determines whether or not to change the display magnification when the full-screen mode and the half-screen mode are switched, by using the trained model subjected to the machine learning based on the setting of the display magnification after the full-screen mode and the half-screen mode are switched, and the type of the application being used.

As a result, the information processing apparatus 10 can appropriately control whether or not to change the display magnification when the switching between the full-screen mode and the half-screen mode is performed, according to the type of the application being used.

Although the embodiments of the present invention have been described above in detail with reference to the accompanying drawings, a specific configuration is not limited to the above-described configuration, and various design changes and the like can be made without departing from the gist of the present invention. For example, the configurations described in the above-described embodiments may be optionally combined.

In addition, in the above-described embodiments, the example of the one-screen mode (full-screen mode) in which display is controlled by using the screen area of the display 150 as one screen area DA, the two-screen mode in which display is controlled by dividing the screen area into the two screen areas, the first screen area DA1 and the second screen area DA2, and the half-screen mode in which display is controlled by using only the first screen area DA1, which is one of the two divided screen areas, as the display area has been described, but the present invention is not limited to the division into the two screen areas in a case in which the screen area of the display 150 is divided, and the screen area may be divided into three or more screen areas. For example, in a case of a three-screen mode in which display is controlled by dividing the screen area of the display 150 into three screen areas, a configuration may be adopted in which two screen areas among the three screen areas are used as the display areas, and the external keyboard 30 is placed on the other one screen area. In this case as well, the display magnification may be changed when the one-screen mode (full-screen mode) in which display is controlled by using the three screen areas as one screen area DA and the screen mode in which the two screen areas are used as the display areas are switched.

Further, the external keyboard 30 that can be placed on the screen of the display 150 in the half-screen mode is not limited to a keyboard that substantially matches the size of the second screen area DA2, and may have, for example, a size smaller than the size of the second screen area DA2. A position at which the keyboard 30 is placed is not limited to a position at which a lower side of the keyboard 30 matches a lower side of the second screen area DA2, may be a position at which an upper side of the keyboard 30 matches an upper side of the second screen area DA2, and may be an intermediate position.

In addition, in the above-described embodiments, the example has been described in which the information processing apparatus 10 is provided with one foldable display 150, but a plurality of displays may be provided. For example, a configuration may be adopted in which the information processing apparatus 10 is provided with a total of two displays, one display on each of the inner surface of the first chassis 101 and one display on the inner surface of the second chassis 102. In a case of the configuration in which the two displays are provided, a configuration may be adopted in which display is controlled by using the screen area in which the screen areas of the two displays are combined into one, as the screen area DA (as the display area) in the full-screen mode, and display is controlled by using the screen area of only one of the two displays as the first screen area DA1 (as the display area) in the half-screen mode. In addition, in the two-screen mode, a configuration may be adopted in which display is controlled by using the screen areas of the two displays as the first screen area DA1 and the second screen area DA2.

In the above-described embodiments, the example of the touch operation on the plurality of touch panel type displays in which the input unit (touch sensor) and the display unit are integrally configured has been described, but the present invention is not limited to the touch operation, and a click operation using a mouse, an operation using a gesture, or the like may be performed.

It should be noted that the information processing apparatus 10 described above has a computer system inside. The process in each configuration of the information processing apparatus 10 described above may be performed by recording a program for realizing the function of each configuration of the information processing apparatus 10 described above on a computer-readable recording medium, and reading the program recorded on the recording medium with the computer system to execute the program. Here, "reading the program recorded on the recording medium into the computer system to execute the program" includes installing the program in the computer system. The "computer system" herein includes the OS or hardware such as peripheral devices. In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built in the computer system. As described above, the recording medium that stores the program may be a non-transitory recording medium such as a CD-ROM.

In addition, the recording medium also includes an internal or external recording medium that can be accessed from a distribution server to distribute the program. It should be noted that a configuration may be used in which the program is divided into a plurality of programs, downloaded at different timings, and then combined with each configuration of the information processing apparatus 10, or distribution servers for distributing the respective divided programs may be different. Further, the "computer-readable recording medium" includes a medium, which holds the program for a certain period of time, such as a volatile memory (RAM) inside the computer system that serves as a server or a client in a case in which the program is transmitted via the network. The above-described program may be a program for realizing a part of the above-described functions. Further, the program may be a so-called difference file (difference program) in which the above-described functions can be realized in combination with the program already recorded in the computer system.

A part or all of the functions of the information processing apparatus 10 in the above-described embodiments may be realized by an integrated circuit such as a large scale integration (LSI). Each of the functions may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technique leads to appearance of an integrated circuit technique that replaces the LSI, an integrated circuit based on the technique may be used.

Description of Symbols 10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
181 placement detection unit
182 display mode control unit
183 display magnification setting unit
184 display control unit
185 external connection detection unit
186 training unit
30 keyboard
50 external display

What is claimed is:
1. An information processing apparatus comprising:
a display;
a memory configured to temporarily store display data to be displayed on the display; and
a processor configured to perform control when the display data stored in the memory is displayed on the display,
wherein the processor is configured to perform
a display mode switching process of switching between a first display mode in which display is controlled by using an entire screen area of the display as a display area, and a second display mode in which display is controlled by using a part of the entire screen area as the display area,
a display control process of, in a case in which the first display mode and the second display mode are switched by the display mode switching process, changing a display magnification to a display magnification individually set for each of the first display mode and the second display mode,
perform an external connection detection process of detecting connection with an external display, and
determine whether or not to change the display magnification by the display control process when the first display mode and the second display mode are switched by the display mode switching process, based on whether or not the external display is connected.

2. The information processing apparatus according to claim 1,
wherein the processor is configured to:
display, on the display, a setting screen on which the display magnification of each of the first display mode and the second display mode is settable by a user, and set the display magnification of each of the first display mode and the second display mode based on an operation of the user on the setting screen.

3. The information processing apparatus according to claim 1,
wherein the processor is configured to:
perform an external connection detection process of detecting connection with an external display; and
in a case in which the connection with the external display is detected, in the display control process, control display of the external display with the display magnification individually set for each of the first display mode and the second display mode according to the switching between the first display mode and the second display mode.

4. The information processing apparatus according to claim 3,
wherein the processor is configured to:
display, on the display, a setting screen on which the display magnification of each of the first display mode and the second display mode is settable by a user for each of the display provided in the information processing apparatus and the external display, and set the display magnification of each of the first display mode and the second display mode for each of the display provided in the information processing apparatus and the external display based on an operation of the user on the setting screen.

5. The information processing apparatus according to claim 4,
wherein, on the setting screen, the display magnification of each of the first display mode and the second display mode is further settable for each specification of the external display.

6. The information processing apparatus according to claim 1,
wherein the processor is configured to:
display, on the display, a selection screen on which whether or not to switch between the display magnifications is selectable by a user when the first display mode and the second display mode are switched in the display mode switching process; and
determine whether or not to change the display magnification by the display control process based on an operation of the user on the selection screen.

7. The information processing apparatus according to claim 1,
wherein the processor is configured to:
determine whether or not to change the display magnification by the display control process when the first display mode and the second display mode are switched by the display mode switching process, by using a trained model subjected to machine learning based on a setting of the display magnification after the first display mode and the second display mode are switched by the display mode switching process, and whether or not the external display is connected.

8. The information processing apparatus according to claim 1,
wherein the processor is configured to:
determine whether or not to change the display magnification by the display control process when the first display mode and the second display mode are switched by the display mode switching process, based on a history for each user of a setting of the display magnification after the first display mode and the second display mode are switched by the display mode switching process.

9. The information processing apparatus according to claim 8,
wherein the processor is configured to:
determine whether or not to change the display magnification by the display control process when the first display mode and the second display mode are switched by the display mode switching process, by using a trained model subjected to machine learning based on the history for each user of the setting of the display magnification after the first display mode and the second display mode are switched by the display mode switching process.

10. The information processing apparatus according to claim 1,
wherein the processor is configured to:
determine whether or not to change the display magnification by the display control process when the first display mode and the second display mode are switched by the display mode switching process, based on a setting of the display magnification after the first display mode and the second display mode are switched by the display mode switching process, and a time zone.

11. The information processing apparatus according to claim 10,
wherein the processor is configured to:
determine whether or not to change the display magnification by the display control process when the first display mode and the second display mode are switched by the display mode switching process, by using a trained model subjected to machine learning based on a history for each time zone of the setting of the display magnification after the first display mode and the second display mode are switched by the display mode switching process.

12. The information processing apparatus according to claim 1,
wherein the processor is configured to:
determine whether or not to change the display magnification by the display control process when the first display mode and the second display mode are switched by the display mode switching process, based on a type of an application being used.

13. The information processing apparatus according to claim 12,
wherein the processor is configured to:
determine whether or not to change the display magnification by the display control process when the first display mode and the second display mode are switched in the display mode switching process, by using a trained model subjected to machine learning based on a setting of the display magnification after the first display mode and the second display mode are switched by the display mode switching process, and the type of the application being used.

14. The information processing apparatus according to claim 1,
wherein the display is one foldable display, and
in the second display mode, one of a plurality of screen areas divided according to a crease portion when the display is folded is used as the display area.

15. A control method in an information processing apparatus including a display, a memory configured to temporarily store display data to be displayed on the display, and a processor configured to perform control when the display data stored in the memory is displayed on the display, the control method comprising:
causing the processor to perform
a display mode switching step of switching between a first display mode in which display is controlled by using an entire screen area of the display as a display area, and a second display mode in which display is controlled by using a part of the entire screen area as the display area,
a display control step of, in a case in which the first display mode and the second display mode are switched by the display mode switching step, changing a display magnification to a display magnification individually set for each of the first display mode and the second display mode,
an external connection detection process of detecting connection with an external display, and
a determination of whether or not to change the display magnification by the display control process when the first display mode and the second display mode are switched by the display mode switching process, based on whether or not the external display is connected.

16. An information processing apparatus comprising:
a display;
a memory configured to temporarily store display data to be displayed on the display; and
a processor configured to perform control when the display data stored in the memory is displayed on the display,
wherein the processor is configured to perform
a display mode switching process of switching between a first display mode in which display is controlled by using an entire screen area of the display as a display area, and a second display mode in which display is controlled by using a part of the entire screen area as the display area,
a display control process of, in a case in which the first display mode and the second display mode are switched by the display mode switching process, changing a display magnification to a display magnification individually set for each of the first display mode and the second display mode,
an external connection detection process of detecting connection with an external display; and
in a case in which the connection with the external display is detected, in the display control process, control display of the external display with the display magnification individually set for each of the first display mode and the second display mode according to the switching between the first display mode and the second display mode.

17. The information processing apparatus according to claim 1,
wherein the processor is configured to:
perform a placement detection process of detecting placement of an external keyboard on a predetermined screen area of the entire screen area of the display, and
in the display mode switching process, switch between the first display mode and the second display mode based on a detection result by the placement detection process.

18. The information processing apparatus according to claim 17,
wherein the processor is configured to:
in the display mode switching process, perform control to the first display mode in a case in which the placement of the external keyboard is not detected by the placement detection process, and perform control to the second display mode in a case in which the placement of the external keyboard is detected, and
in the second display mode, a partial screen area excluding the predetermined screen area is used as the display area.

* * * * *